(12) United States Patent
Sengoku

(10) Patent No.: US 9,201,582 B2
(45) Date of Patent: Dec. 1, 2015

(54) DISPLAY CONTROL APPARATUS AND DISPLAY CONTROL METHOD

(75) Inventor: Takamitsu Sengoku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 384 days.

(21) Appl. No.: 12/615,192

(22) Filed: Nov. 9, 2009

(65) Prior Publication Data

US 2010/0122214 A1 May 13, 2010

(30) Foreign Application Priority Data

Nov. 11, 2008 (JP) .................................. 2008-288946
Nov. 11, 2008 (JP) .................................. 2008-288947

(51) Int. Cl.
| G06F 3/048 | (2013.01) |
| G06F 3/0485 | (2013.01) |
| H04N 21/431 | (2011.01) |
| H04N 21/482 | (2011.01) |
| H04N 21/462 | (2011.01) |

(52) U.S. Cl.
CPC .......... *G06F 3/0485* (2013.01); *H04N 21/4312* (2013.01); *H04N 21/482* (2013.01); *H04N 21/462* (2013.01)

(58) Field of Classification Search
CPC . G06F 3/0485; G06F 3/0482; G06F 3/04842; G06F 3/0488; G06F 3/0481; G06F 3/0486
See application file for complete search history.

(56) References Cited

U.S. PATENT DOCUMENTS

| 7,573,439 B2 * | 8/2009 | Lau et al. ........................... 345/7 |
| 2002/0129366 A1 * | 9/2002 | Schein et al. .................... 725/43 |
| 2006/0024021 A1 | 2/2006 | Utsuki |
| 2006/0250358 A1 | 11/2006 | Wroblewski |
| 2007/0136286 A1 | 6/2007 | Webster |
| 2008/0022224 A1 * | 1/2008 | Coutts ........................... 715/783 |
| 2008/0155475 A1 | 6/2008 | Duhig |
| 2008/0292212 A1 * | 11/2008 | Ozaki ........................... 382/284 |
| 2009/0070710 A1 * | 3/2009 | Kagaya et al. ................. 715/810 |

FOREIGN PATENT DOCUMENTS

| CN | 101382952 | 3/2009 |
| EP | 1148412 A2 | 10/2001 |
| JP | 2003-044194 A | 2/2003 |
| JP | 2003-084881 A | 3/2003 |
| JP | 2006-031115 A | 2/2006 |
| JP | 2006-033776 A | 2/2006 |
| JP | 2006-065368 A | 3/2006 |

* cited by examiner

*Primary Examiner* — Alvin Tan
*Assistant Examiner* — Ayesha Huertas Torres
(74) *Attorney, Agent, or Firm* — Canon U.S.A., Inc. IP Division

(57) ABSTRACT

A display control apparatus includes a display control means. In the display control apparatus, the display control means is configured to scroll-display a plurality of contents. If it is determined that the speed of the scroll display has increased to reach a first predetermined value, then the display control means classifies and groups the plurality of contents by using group classification information corresponding to the plurality of contents and displays the grouped contents. On the other hand, if it is determined that the scroll speed has decreased to reach a second predetermined value, then the display control means sorts the plurality of contents in order according to a selected grouping method and displays group classification information images at a group classification level one stage lower than the current group classification level.

16 Claims, 17 Drawing Sheets

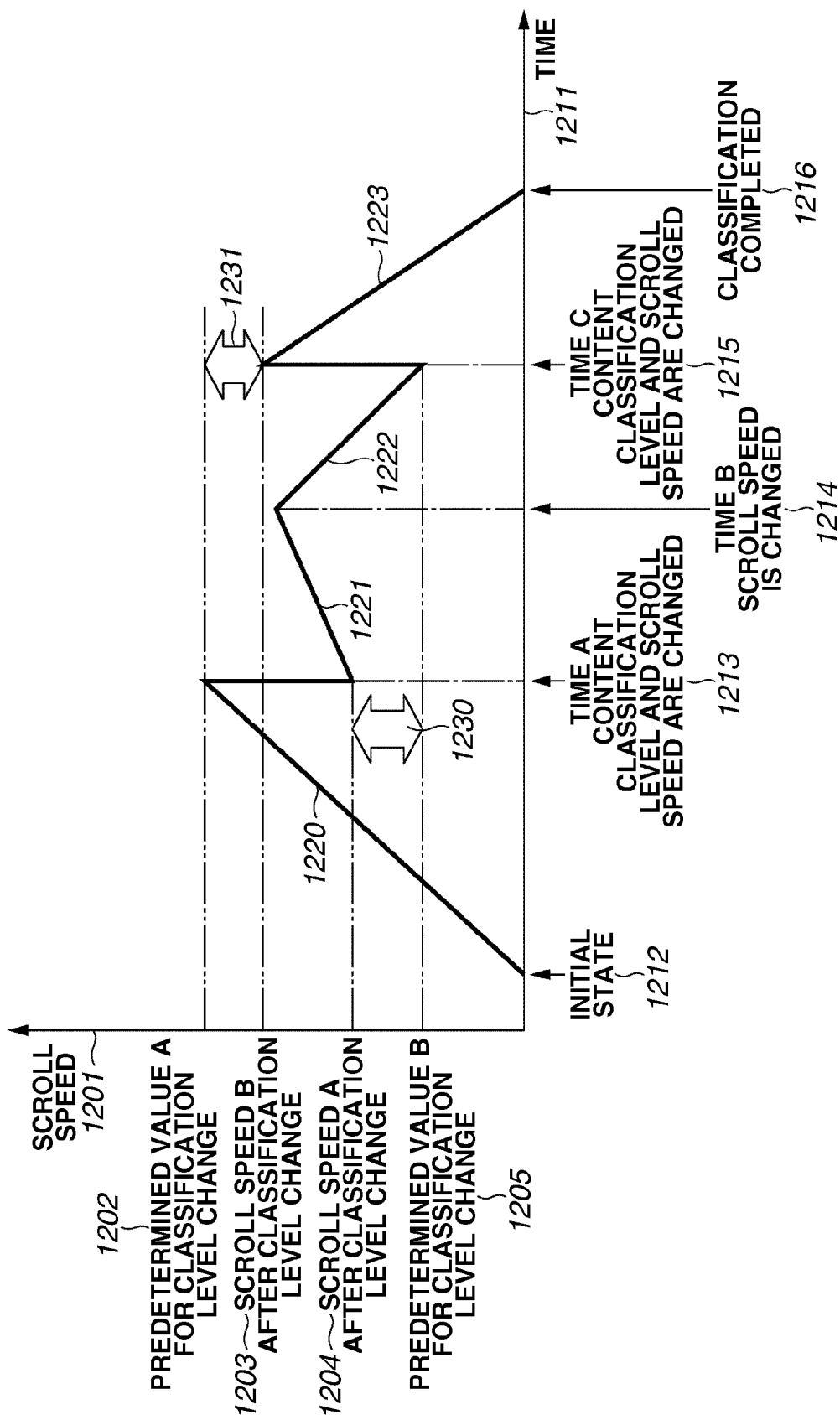

FIG.8A

DISPLAY ORDER AND ATTRIBUTE INFORMATION OF CONTENT BEFORE SORTING

| CONTENT IMAGE NUMBER | CHANNEL NUMBER | ATTRIBUTE INFORMATION 1 | ATTRIBUTE INFORMATION 2 | ATTRIBUTE INFORMATION 3 | ATTRIBUTE INFORMATION 4 |
|---|---|---|---|---|---|
| 411 | 12 | SPORT | BASEBALL | 2006/3/3 | 12:00-15:00 |
| 413 | 3 | VARIETY SHOW | QUIZ SHOW | 2007/5/6 | 19:00-22:00 |
| 414 | 60 | SPORT | BASEBALL | 2006/8/14 | 17:00-18:00 |
| 415 | 27 | SPORT | TRIATHLON | 2002/10/7 | 19:00-21:00 |
| 416 | 600 | VARIETY SHOW | QUIZ SHOW | 2008/9/21 | 19:00-21:00 |
| 417 | 352 | NEWS | WEATHER FORECAST | 2007/3/5 | 19:00-21:00 |
| 418 | 1 | NEWS | DOMESTIC NEWS | 2007/12/21 | 12:00-15:00 |

FIG.8B

DISPLAY ORDER AND ATTRIBUTE INFORMATION OF CONTENT AFTER SORTING

| CONTENT IMAGE NUMBER | CHANNEL NUMBER | ATTRIBUTE INFORMATION 1 | ATTRIBUTE INFORMATION 2 | ATTRIBUTE INFORMATION 3 | ATTRIBUTE INFORMATION 4 |
|---|---|---|---|---|---|
| 411 | 12 | SPORT | BASEBALL | 2006/3/3 | 12:00-15:00 |
| 414 | 60 | SPORT | BASEBALL | 2006/8/14 | 17:00-18:00 |
| 415 | 27 | SPORT | TRIATHLON | 2002/10/7 | 19:00-21:00 |
| 413 | 3 | VARIETY SHOW | QUIZ SHOW | 2007/5/6 | 19:00-22:00 |
| 416 | 600 | VARIETY SHOW | QUIZ SHOW | 2008/9/21 | 19:00-21:00 |
| 417 | 352 | NEWS | WEATHER FORECAST | 2007/3/5 | 19:00-21:00 |
| 418 | 1 | NEWS | DOMESTIC NEWS | 2007/12/21 | 12:00-15:00 |

DISPLAY SCREEN AT LOWEST ABSTRACTION LEVEL

DISPLAY SCREEN DISPLAYED WHEN ABSTRACTION LEVEL IS INCREASED ONE STAGE FURTHER

DISPLAY SCREEN DISPLAYED WHEN THE ABSTRACTION LEVEL IS RETURNED TO LOWEST LEVEL

CLASSIFICATION METHOD IN WHICH EVERY CONTENT
BELONGS TO EITHER ONE OF CLASSIFICATIONS

FIG.14
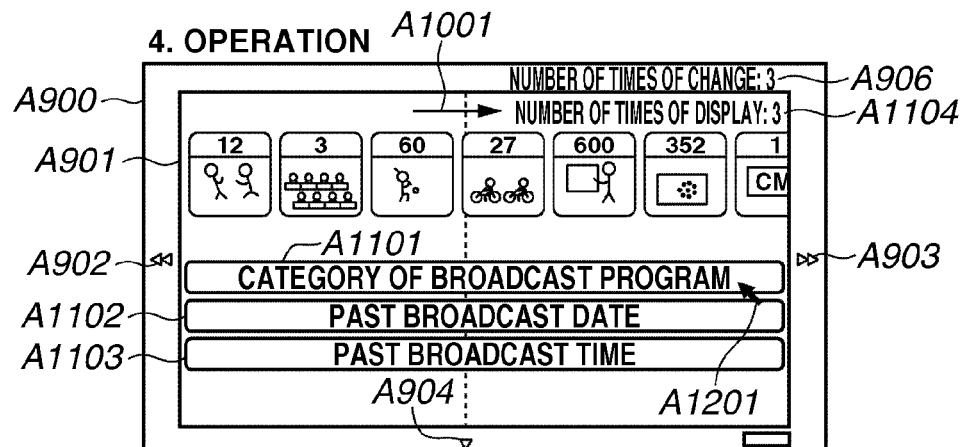
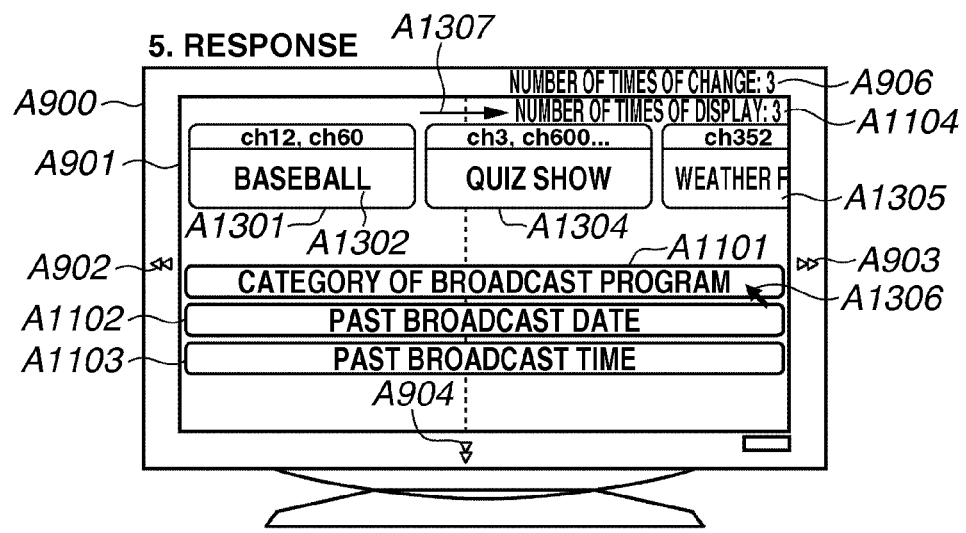
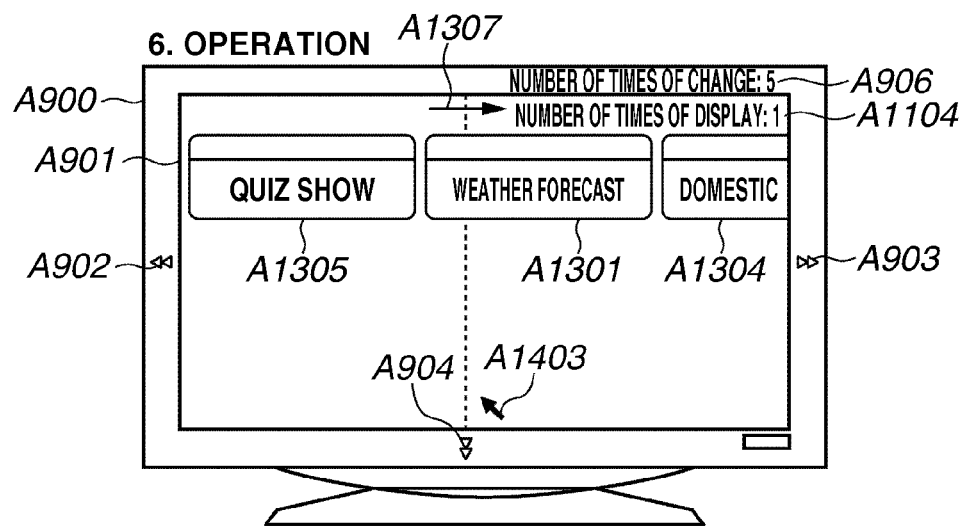

FIG.16A

DISPLAY ORDER AND ATTRIBUTE INFORMATION OF CONTENT BEFORE SORTING

| | CONTENT IMAGE NUMBER | CHANNEL NUMBER | ATTRIBUTE INFORMATION 1 | ATTRIBUTE INFORMATION 2 | ATTRIBUTE INFORMATION 3 | ATTRIBUTE INFORMATION 4 |
|---|---|---|---|---|---|---|
| A | 411 | 12 | SPORT | BASEBALL | 2006/3/3 | 12:00-15:00 |
| B | 413 | 3 | VARIETY SHOW | QUIZ SHOW | 2007/5/6 | 19:00-22:00 |
| C | 414 | 60 | SPORT | BASEBALL | 2006/8/14 | 17:00-20:00 |
| D | 415 | 27 | SPORT | BASEBALL | 2002/10/7 | 19:00-21:00 |
| E | 416 | 600 | VARIETY SHOW | QUIZ SHOW | 2008/9/21 | 12:00-15:00 |
| F | 417 | 1 | NEWS | WEATHER FORECAST | 2007/3/5 | 19:00-20:00 |
| G | 418 | 352 | NEWS | DOMESTIC NEWS | 2007/12/21 | 12:00-15:00 |

FIG.16B

DISPLAY ORDER AND ATTRIBUTE INFORMATION OF CONTENT AFTER SORTING

| | CONTENT IMAGE NUMBER | CHANNEL NUMBER | ATTRIBUTE INFORMATION 1 | ATTRIBUTE INFORMATION 2 | ATTRIBUTE INFORMATION 3 | ATTRIBUTE INFORMATION 4 |
|---|---|---|---|---|---|---|
| A | 411 | 12 | SPORT | BASEBALL | 2006/3/3 | 12:00-15:00 |
| B | 414 | 60 | SPORT | BASEBALL | 2006/8/14 | 17:00-18:00 |
| C | 415 | 27 | SPORT | BASEBALL | 2002/10/7 | 19:00-21:00 |
| D | 413 | 3 | VARIETY SHOW | QUIZ SHOW | 2007/5/6 | 19:00-22:00 |
| E | 416 | 600 | VARIETY SHOW | QUIZ SHOW | 2008/9/21 | 12:00-15:00 |
| F | 417 | 1 | NEWS | WEATHER FORECAST | 2007/3/5 | 19:00-21:00 |
| G | 418 | 352 | NEWS | DOMESTIC NEWS | 2007/12/21 | 12:00-15:00 |

FIG.17

| | CONTENT IMAGE NUMBER | CHANNEL NUMBER | ATTRIBUTE INFORMATION 1 | ATTRIBUTE INFORMATION 2 | ATTRIBUTE INFORMATION 3 | ATTRIBUTE INFORMATION 4 | ATTRIBUTE INFORMATION 5 |
|---|---|---|---|---|---|---|---|
| A1 | 4111 | 12 | SPORT | BASEBALL | INNINGS 1 TO 3 | 2006/3/3 | 12:00-13:00 |
| A2 | 4112 | 12 | SPORT | BASEBALL | INNINGS 4 TO 6 | 2006/3/3 | 13:00-14:00 |
| A3 | 4113 | 12 | SPORT | BASEBALL | INNINGS 7 TO 9 | 2006/3/3 | 14:00-15:00 |
| B1 | 4131 | 3 | VARIETY SHOW | QUIZ SHOW | QUESTION 1 TO 3 | 2007/5/6 | 19:00-20:00 |
| B2 | 4132 | 3 | VARIETY SHOW | QUIZ SHOW | QUESTION 4 TO 6 | 2007/5/6 | 20:00-21:00 |
| B3 | 4133 | 3 | VARIETY SHOW | QUIZ SHOW | QUESTION 7 TO 9 | 2007/5/6 | 21:00-22:00 |
| C1 | 4141 | 60 | SPORT | BASEBALL | INNINGS 1 TO 3 | 2006/8/14 | 17:00-18:00 |
| C2 | 4142 | 60 | SPORT | BASEBALL | INNINGS 4 TO 6 | 2006/8/14 | 18:00-19:00 |
| C3 | 4143 | 60 | SPORT | BASEBALL | INNINGS 7 TO 9 | 2006/8/14 | 19:00-20:00 |
| D1 | 4151 | 27 | SPORT | BASEBALL | INNINGS 1 TO 3 | 2002/10/7 | 19:00-20:00 |
| D2 | 4152 | 27 | SPORT | BASEBALL | INNINGS 4 TO 6 | 2002/10/7 | 20:00-20:30 |
| D3 | 4153 | 27 | SPORT | BASEBALL | INNINGS 7 TO 9 | 2002/10/7 | 20:30-21:00 |
| E1 | 4161 | 600 | VARIETY SHOW | QUIZ SHOW | QUESTION 1 TO 3 | 2008/9/21 | 12:00-13:00 |
| E2 | 4162 | 600 | VARIETY SHOW | QUIZ SHOW | QUESTION 4 TO 6 | 2008/9/21 | 13:00-14:00 |
| E3 | 4163 | 600 | VARIETY SHOW | QUIZ SHOW | QUESTION 7 TO 9 | 2008/9/21 | 14:00-15:00 |
| F1 | 4171 | 1 | NEWS | WEATHER FORECAST | WHOLE COUNTRY | 2007/3/5 | 19:00-19:30 |
| F2 | 4172 | 1 | NEWS | WEATHER FORECAST | REGIONAL | 2007/3/5 | 19:30-20:00 |
| G1 | 4181 | 352 | NEWS | DOMESTIC NEWS | DOMESTIC NEWS | 2007/12/21 | 12:00-15:00 |

DISPLAY CONTROL APPARATUS AND DISPLAY CONTROL METHOD

BACKGROUND OF THE INVENTION

1. Field of the Invention

The present invention relates to a method for displaying data content.

2. Description of the Related Art

In recent years, a user of an image display apparatus generally selects a content to view from among a multiple of contents. More specifically, for example, various broadcast programs are widely provided by various different types of methods. Therefore, the number of contents that a user can view has increased. Accordingly, a user can select a broadcast program to view from among a large number of broadcast programs.

In addition, as the capacity and performance of a storage medium have increased and improved, known storage media can store a large number of contents. Accordingly, a user can select a content to view from among multiple contents stored on a large-capacity storage medium.

Japanese Patent Application Laid-Open No. 2003-044194 discusses a method for selecting a content to view from among multiple contents. In the method discussed in Japanese Patent Application Laid-Open No. 2003-044194, if a user increases the speed of rotating a jog dial, the speed of a scrolling action through the multiple contents is increased. This display of multiple content items by scrolling through them is hereinbelow referred to as "scroll-display." Furthermore, in that application, the size of each content item to be scroll-displayed is reduced. In this manner, the method discussed in Japanese Patent Application Laid-Open No. 2003-044194 can display a large number of contents at once.

Japanese Patent Application Laid-Open No. 2006-065368 discusses another conventional content display method. More specifically, the method discussed in Japanese Patent Application Laid-Open No. 2006-065368 groups still images according to the photo-shooting date and time and displays a thumbnail of an image representative of the image group based on a user request.

However, in the above-described conventional methods, depending on the content type, a user cannot always effectively select a content to view.

More specifically, if a plurality of contents is grouped according to a user request and if a representative image of a group is to be changed to another one and displayed, then it becomes necessary for the user to give a first instruction for grouping the contents and a second instruction for changing the representative image, the two instructions being separate from each other.

Furthermore, in the above-described conventional method for reducing the size of the content that is scroll-displayed according to the rotation speed of a jog dial to increase the number of contents to be displayed, if the user rotates the jog dial at too high a speed, the user may overlook a content to be viewed because contents displayed in a small size are often scroll-displayed at a high speed.

SUMMARY OF THE INVENTION

The present invention is directed to a method for effectively selecting a content to view from among a plurality of contents.

The present invention in its first aspect provides a display control apparatus as specified in claims 1 to 13. A second aspect of the present invention provides a display control method as specified in claim 14. A third aspect of the present invention provides a computer program and a computer-readable storage medium as specified in claims 15 and 16 respectively.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 7 is a timing chart illustrating an exemplary scroll speed and changing of a content group classification level at various timings according to an exemplary embodiment of the present invention.

FIGS. 8A and 8B illustrate examples of attribute information of each content item according to an exemplary embodiment of the present invention.

FIG. 14 illustrates an example of a display screen according to an exemplary embodiment of the present invention.

FIGS. 16A and 16B illustrate a first example of an order of displaying contents, and attribute information according to an exemplary embodiment of the present invention.

FIG. 17 illustrates a second example of an order of displaying contents, and attribute information according to an exemplary embodiment of the present invention.

DESCRIPTION OF THE EMBODIMENTS

Various exemplary embodiments, features, and aspects of the invention will be described in detail below with reference to the drawings.

Figure 1:
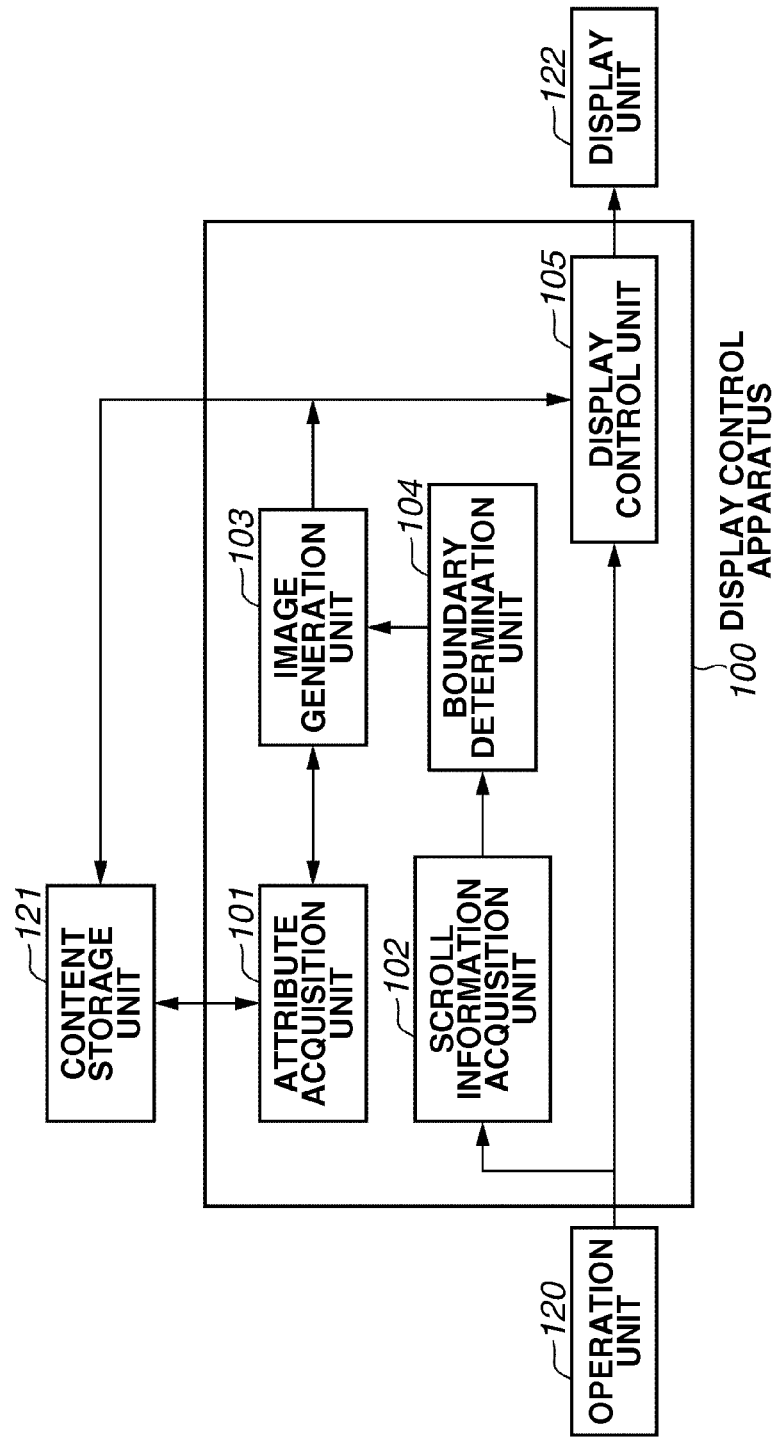
FIG. 1 illustrates an exemplary configuration of a display control apparatus according to an exemplary embodiment of the present invention.

FIG. 1 illustrates an example of a functional configuration of the display control apparatus 100 according to an exemplary embodiment of the present invention. The display control apparatus 100 according to the present exemplary embodiment displays a plurality of contents by scrolling through them. It is useful if the display control apparatus 100 is integrally mounted on a display apparatus or is a separate apparatus connected to the display apparatus.

More specifically, it is also useful if the display control apparatus 100 according to the present exemplary embodiment is integrally mounted on an apparatus, such as a personal computer (PC), a workstation, a notebook PC, various home appliances including a computer, a gaming machine, a cellular phone, a digital video camera, or a digital still camera.

In the present exemplary embodiment, a method for selecting a moving image content to view from among a plurality of moving image contents will be described. However, the present exemplary embodiment is not limited to this. More specifically, "content" or "a content item" (or occasionally, "a content") according to the present exemplary embodiment may include a still image, audio data, or various other stream data, as well as moving image content, or may include a combination thereof.

Referring to FIG. 1, the display control apparatus 100 according to the present exemplary embodiment includes an attribute acquisition unit 101, a scroll-information acquisition unit 102, an image generation unit 103, a boundary determination unit 104, and a display control unit 105.

In addition, the display control apparatus 100 according to the present exemplary embodiment is connected to an operation unit 120, a content storage unit 121, and a display unit 122 by wired or wireless communication. The operation unit 120 is, for example, a remote controller, which performs a scroll operation or designates a content to view. Scroll information, which is input by the operation unit 120 according to a user operation, is output to the scroll information acquisition unit 102 and the display control unit 105. Information for designating content to view, which is input by the operation unit 120, is output to the display control unit 105.

The content storage unit 121 stores moving image content and attribute information about each moving image content item. In addition, the content storage unit 121 notifies the attribute acquisition unit 101 of the attribute information about each moving image content item according to a request from the attribute acquisition unit 101.

Furthermore, the content storage unit 121 outputs thumbnail images (content images) of a plurality of moving image content items to the display control unit 105. Moreover, the content storage unit 121 outputs data of the designated moving image content to the display control unit 105.

The display unit 122 displays a still image and a moving image according to an output from the display control unit 105. More specifically, the display unit 122 displays a thumbnail image (a content image) for identifying moving image content according to an output from the display control unit 105. In addition, the display unit 122 displays the designated moving-image content according to an output from the display control unit 105.

The attribute acquisition unit 101 acquires attribute information about moving image content. More specifically, the attribute acquisition unit 101 acquires attribute information corresponding to a plurality of content items stored on the content storage unit 121. The attribute information will be described in detail below.

The scroll-information acquisition unit 102 acquires scroll information according to a scroll operation input by the user operating the operation unit 120. More specifically, when the user performs a scroll operation via the operation unit 120, the scroll-information acquisition unit 102 acquires, for example, information about the scroll speed as scroll information.

In addition, the scroll-information acquisition unit 102 notifies the acquired scroll speed to the boundary determination unit 104. The boundary determination unit 104 compares the scroll information notified from the scroll-information acquisition unit 102 with a boundary condition. More specifically, the boundary determination unit 104 compares the scroll speed notified from the scroll-information acquisition unit 102 with a predetermined speed.

The boundary determination unit 104 determines whether to change a group classification level according to a result of the comparison. In the present exemplary embodiment, a "group classification level" refers to a hierarchy of attribute information of the content. For example, "sport" will be at the highest group classification level, the next level down will be "baseball," which is a more specific attribute. The yet next level down might be the date, and the next the time that the relevant sport programme is to be broadcast, for example. Further examples of group classification levels are shown in FIG. 8A and described below. Moving image content, which may belong to a plurality of classified groups at the same time when contents are grouped by a low group classification level (e.g. programme date), may belong to one specific classified group if classified and grouped at a higher group classification level.

In the present exemplary embodiment, if the group classification level is raised, then a plurality of contents are more roughly grouped according to attributes thereof.

For easier understanding of a group classification level, a method for grouping a plurality of contents according to a category of a broadcast program will be described in detail below. In the present exemplary embodiment, if a plurality of content items is grouped by a lowest group classification level, a content image thereof is displayed.

In the present exemplary embodiment, a thumbnail image can be used as the content image. A content image corresponds to each moving image content stored on the content storage unit 121. More specifically, if a plurality of content items is grouped by the lowest group classification level, each content image currently scroll-displayed corresponds to a moving image content stored on the content storage unit 121 one to one.

In addition, if the group classification level is raised from the lowest group classification level by one stage, for example, the following group classification information is used as the group classification information for classifying and grouping moving image contents. The group classification information includes information, such as "domestic news broadcast program", "international news broadcast program", "weather forecast", "baseball", "football", "tennis", "sumo wrestling", "quiz show", or "health information broadcast program". For example, contents having attribute information "domestic news broadcast program" belong to the same group.

In addition, if the group classification level is further raised by one stage, group classification information such as "news", "sports", or "variety show" is used as the group classification information for classifying and grouping a plurality of moving image contents.

In the present exemplary embodiment, the group classification information "news", "sports", and "variety show" are the group classification information of the highest group classification level.

As described above, each moving image content item is classified and grouped into a group according to the group classification information corresponding to the group classification level and the attribute information included in the moving image content.

In the present exemplary embodiment, the contents classified into "domestic news broadcast program", "international news broadcast program", and "weather forecast" groups in a group classification level that is one stage higher than the lowest group classification level are further classified and grouped into the "news" group in a yet one stage higher group classification level.

In addition, in the present exemplary embodiment, the contents classified into "baseball", "football", "tennis", and "sumo wrestling" groups in a group classification level that is one stage higher than the lowest group classification level are further classified and grouped into the "sports" group in a yet one stage higher group classification level.

In addition, in the present exemplary embodiment, the contents classified into "quiz show" and "health information broadcast program" groups in a second-lowest group classification level are further classified and grouped into the "variety show" group in the one stage higher group classification level.

In the above-described manner, each of the moving image contents, which belongs to a plurality of groups ("baseball" "football" "tennis", and "sumo wrestling", for example) by a classification and grouping at a low group classification level, belongs to one specific group ("sports" in this case) when classified and grouped at a higher group classification level.

Now, as another example of the group classification level, a method for classifying and grouping a plurality of contents according to the broadcast start time will be described in detail below.

If the group classification level is raised from the lowest group classification level by one stage, the broadcast of each moving image content is classified by the broadcast start time at an interval of three hours, for example. More specifically, if the group classification level is raised from the lowest group classification level by one stage, the following group classification information for classifying and grouping a plurality of contents is used.

Namely, the group classification information, such as "broadcast start time from midnight and before 03:00", "broadcast start time from 03:00 and before 06:00" . . . "broadcast start time from 18:00 and before 21:00", and "broadcast start time from 21:00 and before midnight", may be used.

More specifically, a content whose attribute information about the broadcast start time is "16:00", is classified and grouped into the "broadcast start time from 15:00 and before 18:00" group. Thus, each moving-image content item is classified and grouped according to the group classification information corresponding to the group classification level and the attribute information included in the moving image content.

If the group classification level is further raised from the above-described group classification level by one stage, the present exemplary embodiment classifies and groups the moving image contents in the broadcast start time unit of six hours, for example.

Namely, the group classification information for classifying and grouping the moving image contents, such as "broadcast start time from 00:00 and before 06:00", "broadcast start time from 06:00 and before 12:00", "broadcast start time from 12:00 and before 18:00", and "broadcast start time from 18:00 and before 00:00", is used in this case.

The above-described group classification level for classifying and grouping the contents in the broadcast start time unit of three hours is one stage lower than the group classification level for classifying and grouping the contents in the broadcast start time unit of six hours. In other words, in the present exemplary embodiment, a state where the moving image contents stored on the content storage unit 121 are not classified, is the lowest group classification level.

Furthermore, the group classification level for classifying and grouping the contents in the broadcast start time unit of three hours is the group classification level higher than the lowest group classification level by one stage. Moreover, the group classification level for classifying and grouping the contents in the broadcast start time unit of six hours is the highest group classification level.

More specifically, each of the moving image contents that belong to the "broadcast start time from 00:00 and before 03:00" and "broadcast start time from 03:00 and before 06:00" groups is, for example, grouped into the "broadcast start time from 00:00 and before 06:00" group if the contents are classified and grouped in the group classification level higher than the broadcast start time unit of three hours.

As described above, in the present exemplary embodiment, moving image contents, which may belong to a plurality of classified groups at the same time when contents are grouped by a low group classification level, may belong to one specific classified group if classified and grouped at a higher group classification level.

Now, as yet another example of the group classification level, a method for classifying and grouping a plurality of contents according to the broadcast date and time will be described in detail below.

In this case, if the group classification level is raised from the lowest group classification level by one stage, the broadcast date and time of each moving image content is classified in the broadcast date and time unit of one week, for example. Furthermore, if the contents are classified by a group classification level further one stage higher than the above-described group classification level, the present exemplary embodiment classifies and groups the moving image contents, for example, in the broadcast date and time unit of one month.

Moreover, if the contents are classified by a group classification level yet further one stage higher than the above-described group classification level, the present exemplary embodiment classifies and groups the moving image contents, for example, in the broadcast date and time unit of one year. The group classification level for classifying and grouping the contents in the broadcast date and time unit of one year is the highest group classification level in this case.

In the present exemplary embodiment, a plurality of moving image contents is classified and grouped according to the group classification level described above. However, the present exemplary embodiment is not limited to this. More specifically, it is also useful if a group classification level or group classification information other than those described above may be used.

In the present exemplary embodiment, it is supposed that the boundary determination unit 104 previously acquires and holds information about the group classification level corresponding to each group classification information. More specifically, each content is provided with group classification information corresponding to a first group classification level, such as "domestic news broadcast program", "international news broadcast program", "weather forecast", "baseball", "football", "tennis", "sumo wrestling", "quiz show", or "health information broadcast program". In addition, each content is provided with group classification information corresponding to a second group classification level, such as "news", "sports", or "variety show".

When the user designates that group classification information corresponding to a specific group classification level is to be displayed, the present exemplary embodiment displays the group classification information corresponding to the group classification level designated to be displayed. More specifically, if the user designates that the group classification information corresponding to the first group classification level is to be displayed, the present exemplary embodiment displays the group classification information corresponding to the first group classification level, which is provided in a selectable content. On the other hand, if the user designates that the group classification information corresponding to the second group classification level is to be displayed, the present exemplary embodiment displays the group classification information corresponding to the second group classification level, which is provided in a selectable content.

In addition, the boundary determination unit 104 according to the present exemplary embodiment changes the group classification information for classifying the contents (the group classification level) according to a result of comparison between the scroll speed levels.

The image generation unit 103 generates an image including moving image content group classification information (a group classification information image).

In the present exemplary embodiment, the image generation unit 103 generates a still image including the group classification information corresponding to a plurality of contents. However, it is also useful if the image generation unit 103 generates a moving image.

In addition, it is also useful if the image generation unit 103 previously generates a group classification information image. Furthermore, it is also useful if the image generation unit 103 generates a group classification information image according to a determination by the boundary determination unit 104 that a group classification information image is displayed.

In the present exemplary embodiment, if the contents are grouped according to the category of the broadcast program, the attribute information (e.g., "sports", "quiz show", or "baseball") included in the content is equivalent to the group classification information displayed on the screen. On the other hand, if the contents are grouped according to the broadcast start time, the attribute information included in the content (e.g., "13:15") is different from the group classification information displayed on the screen (e.g., "broadcast start time from 12:00 and before 15:00").

As described above, the attribute information included in a content and the group classification information included in a group classification information image may be similar to, or different from, each other.

The image generation unit 103 outputs data of the generated group classification information image to the display control unit 105. The display control unit 105 displays an image for identifying a moving image content stored on the content storage unit 121 (e.g., a thumbnail image (a content image)) on the display unit 122.

The display control unit 105 displays a plurality of content images in a scroll display state according to the scroll operation performed by the user via the operation unit 120. More specifically, the display control unit 105 scrolls through the contents (i.e. through a plurality of content images).

In addition, the display control unit 105 reads the moving image content from the content storage unit 121 according to the content image designation information received from the operation unit 120 and displays the read moving image content on the display unit 122.

Furthermore, after receiving the data of the group classification information image from the image generation unit 103, the display control unit 105 displays the group classification information image on the display unit 122. The group classification information image is received according to the scroll speed. More specifically, the display control unit 105 switches the display and determines whether to display the group classification information (by displaying the group classification information image) so that the group classification information corresponding to a plurality of content items are displayed according to the scroll speed.

Now, an exemplary flow of processing executed by the display control apparatus 100 according to the present exemplary embodiment will be described in detail below.

Figure 2:
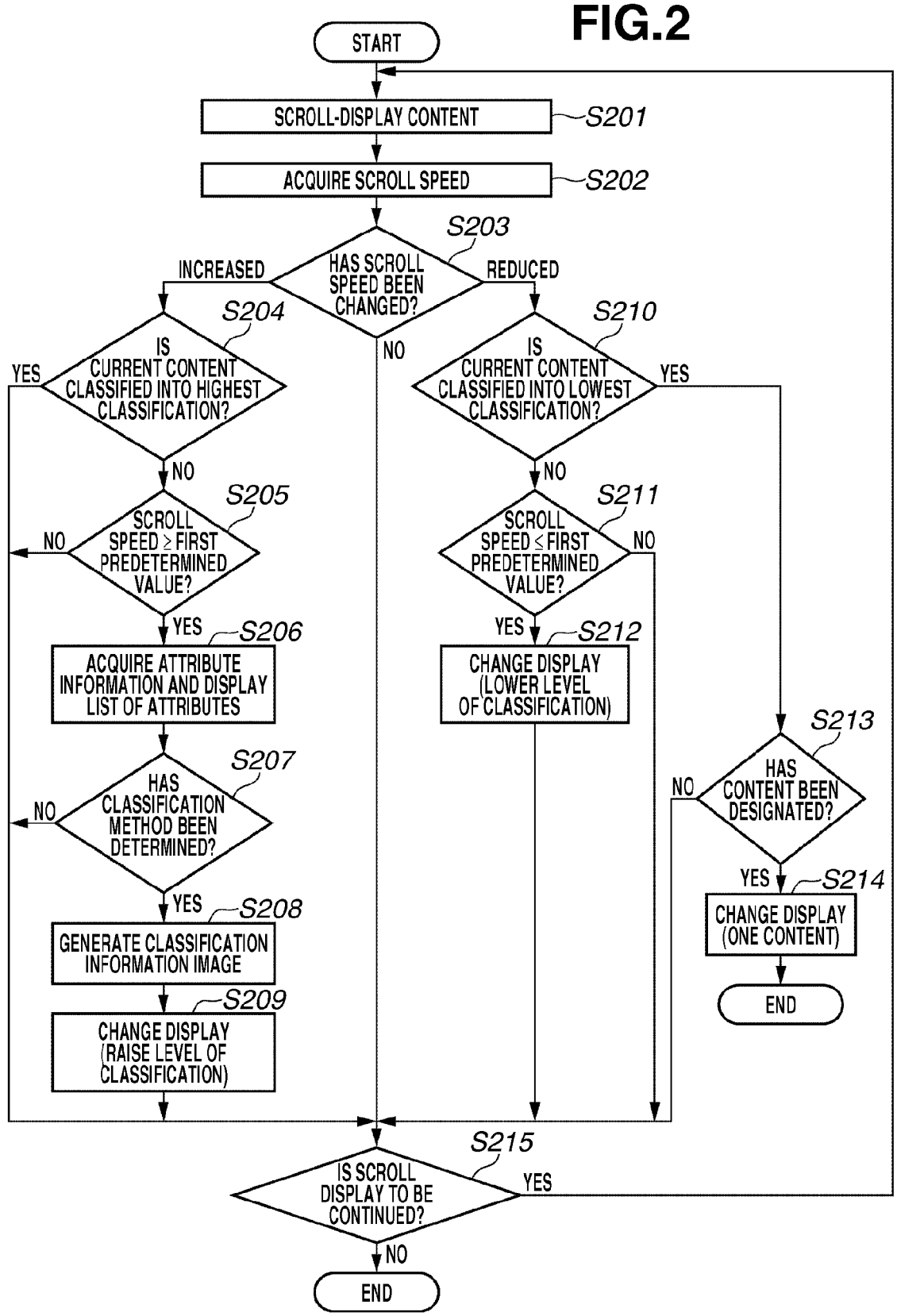
FIG. 2 is a flow chart illustrating an example of scroll processing executed by the display control apparatus according to an exemplary embodiment of the present invention.

FIG. 2 is a flow chart illustrating exemplary flow of display control processing executed by the display control apparatus 100 according to the present exemplary embodiment.

The display control apparatus 100 according to the present exemplary embodiment executes processing of each component illustrated in FIG. 1 by using dedicated hardware. However, the processing of each component of the display control apparatus 100 can also be executed by software.

More specifically, it is useful if the processing described in the present exemplary embodiment is executed by a central processing unit (CPU) that controls the operation of the components of the display control apparatus 100 by loading and executing a program from the ROM and so on.

In the present exemplary embodiment, when the user performs a scroll operation for scrolling the contents to be displayed, the processing illustrated in FIG. 2 starts.

Referring to FIG. 2, in step S201 (scroll processing), the display control unit 105 scroll-displays the thumbnail images (the content images) of a plurality of contents, each of which is a candidate of the content to view, on the display screen of the display unit 122.

In the present exemplary embodiment, before the scroll display is started, a plurality of content images is displayed in a paused state. However, it is also useful if the scroll display of a plurality of content images is started simultaneously with or at least in dependence on the activation of the display unit 122. A content image corresponds to a content stored on the content storage unit 121 in a one to one relation. The user can reproduce a content to view by designating a content image.

More specifically, in step S201, the display control unit 105 scroll-displays a plurality of contents (a plurality of content images). However, the present exemplary embodiment is not limited to this. More specifically, the content images to be scroll-displayed can include a moving image in addition to or instead of a plurality of thumbnail still images and can include audio data.

The display control unit 105 scrolls the plurality of contents according to the scroll speed determined by the scroll operation performed by the user via the operation unit 120 and displays the content images. While executing the processing illustrated in FIG. 2, the control unit 105 continues the scroll display of the content images or the group classification information images.

In step S202, the scroll information acquisition unit 102 acquires information about the scroll speed based on a user input via the operation unit 120. More specifically, the scroll speed information includes information about the amount of variation of the scroll speed from the last-acquired scroll speed variation amount. In the present exemplary embodiment, the scroll speed is changed according to the coordinates of a mouse pointer 404 (FIG. 4) on the screen of the operation unit 120.

More specifically, when the user moves the mouse pointer 404 leftward across a vertical centre line 419 of a display screen 401 in an initial display state (a display state shown as "1. start" in FIG. 3 or 4, for instance), a leftward positive acceleration is applied to the scroll speed. On the other hand, when the user moves the mouse pointer 404 rightward across the vertical centre line 419 of the display screen 401 in the display state "1. start" (FIGS. 3, 4), a rightward positive acceleration is applied to the scroll speed.

Furthermore, when the user moves the mouse pointer 404 leftward across the vertical centre line 419, the present exemplary embodiment increments the scroll speed by 1 image per second. On the other hand, when the user moves the mouse pointer 404 rightward across the vertical centre line 419, the present exemplary embodiment decrements the scroll speed by 1 image per second. The user can move the mouse pointer 404 outside the display screen 401 if the user does not want to change the scroll speed.

If the value of the scroll speed is positive, the display control unit 105 executes a leftward scroll at a basic scroll speed. On the other hand, if the value of the scroll speed is negative, the display control unit 105 executes a rightward scroll at the basic scroll speed.

Accordingly, the scroll information acquisition unit 102 acquires the scroll speed information (the information about the amount of variation of the scroll speed from the last-acquired scroll speed variation amount) according to the information about the coordinates of the mouse pointer 404, which is input by a user operation via the operation unit 120.

However, the method for changing the scroll speed is not limited to the above-described method. More specifically, it is also useful if the magnitude of acceleration to be applied to the scroll speed varies according to a distance of a position of the mouse pointer 404 from the centre of the screen. Furthermore, it is also useful if the speed of the leftward or rightward scroll is increased in proportion to a time period from when the user presses a left arrow 402 (FIG. 4) or a right arrow 403 (FIG. 4) with the mouse pointer 404 (by pressing a mouse button) until when the pressing thereof is discontinued.

In this case, the scroll information acquisition unit 102 acquires the scroll speed information according to the coordinates of the mouse pointer 404 input by the user operation via the operation unit 120, the positional information about the left arrow 402 and the right arrow 403, and information about the user operation of the mouse button.

The scroll information acquisition unit 102 outputs the information about the scroll speed acquired in step S202 to the boundary determination unit 104. Then, then the processing advances to step S203. In step S203, the boundary determination unit 104 determines whether changing of the scroll speed has been instructed by the user according to the scroll speed information output from the scroll information acquisition unit 102 in step S202.

If it is determined that no instruction for changing the scroll speed has been issued (No in step S203), then the processing advances to step S215. On the other hand, if it is determined that the user has given an instruction for increasing the scroll speed ("Increased" in step S203), then the processing advances to step S204. If it is determined that the user has given an instruction for reducing the scroll speed ("Reduced" in step S203), then the processing advances to step S210.

If the processing in step S203 is to be executed for the first time after starting the scroll display, then the processing can advance directly to step S215.

In step S204, the boundary determination unit 104 determines whether the current group classification level is the highest group classification level. More specifically, in the present exemplary embodiment, the display control apparatus 100 determines whether the group classification level can be raised.

If it is determined that the current group classification level is the highest group classification level (Yes in step S204), then the processing advances to step S215. On the other hand, if it is determined that the current group classification level is not the highest group classification level (No in step S204), then the processing advances to step S205.

In step S215, the display control unit 105 determines whether the user has given an instruction for discontinuing the scroll display via the operation unit 120. If it is determined that the user has given an instruction for discontinuing the scroll display by giving an instruction for discontinuing the scroll processing or by powering off the display unit 122 (No to the question of whether the scroll display is to be continued in step S215), then the processing ends. On the other hand, if it is determined that the scroll display is not to be discontinued, i.e. it is to be continued (Yes in step S215), then the processing returns to step S201.

More specifically, if it is determined that the current group classification level is the highest group classification level (Yes in step S204), then the display control unit 105 determines that the group classification level cannot be raised from the current level and executes control for continuing or discontinuing the scroll display.

In step S205, the boundary determination unit 104 determines whether the current scroll speed value is equal to or higher than a first predetermined value. If it is determined that the current scroll speed value is equal to or higher than the first predetermined value (Yes in step S205), then the processing advances to step S206. On the other hand, if it is determined that the current scroll speed value is lower than the first predetermined value (No in step S205), then the processing advances to step S215.

For the first predetermined value, a specific constant predetermined value or different values determined according to the current group classification level can be used. If a specific constant predetermined value is used as the first predetermined value regardless of the current group classification level, as an example, it is useful to reduce the scroll speed when the group classification level is raised. The processing will be described in detail below.

In step S206, the attribute acquisition unit 101 acquires the attribute information corresponding to the plurality of contents stored on the content storage unit 121. The attribute information includes attribute information related to the category of the broadcast programs (e.g., "sports", "baseball", and "inter-high school baseball games") and that related to the broadcast time (e.g., "broadcast date and time", "broadcast start time", and "broadcast time length").

As described above, attribute information related to a plurality of broadcast program categories or attribute information related to a plurality of types of broadcast time may correspond to one content.

In step S206, the attribute acquisition unit 101 acquires the attribute information according to the current group classification level. More specifically, if the group classification level is low, the attribute acquisition unit 101 acquires the attribute information such as "inter-high school baseball games" or "professional baseball game" in step S206. On the other hand, if the group classification level is higher than the low group classification level, the attribute acquisition unit 101 acquires the attribute information "baseball" in step S206, for example.

The attribute acquisition unit 101 notifies the acquired attribute information to the image generation unit 103. In addition, in step S206, the image generation unit 103 generates a plurality of images indicating a method for grouping a plurality of contents according to the attribute information notified from the attribute acquisition unit 101. Furthermore, the content image generation unit 103 outputs data of the plurality of images indicating the method for grouping the contents to the display control unit 105.

In addition, the display control unit 105 displays the input image indicating the method for grouping the contents on the display unit 122. Then, the processing advances to step S207.

Figure 4:
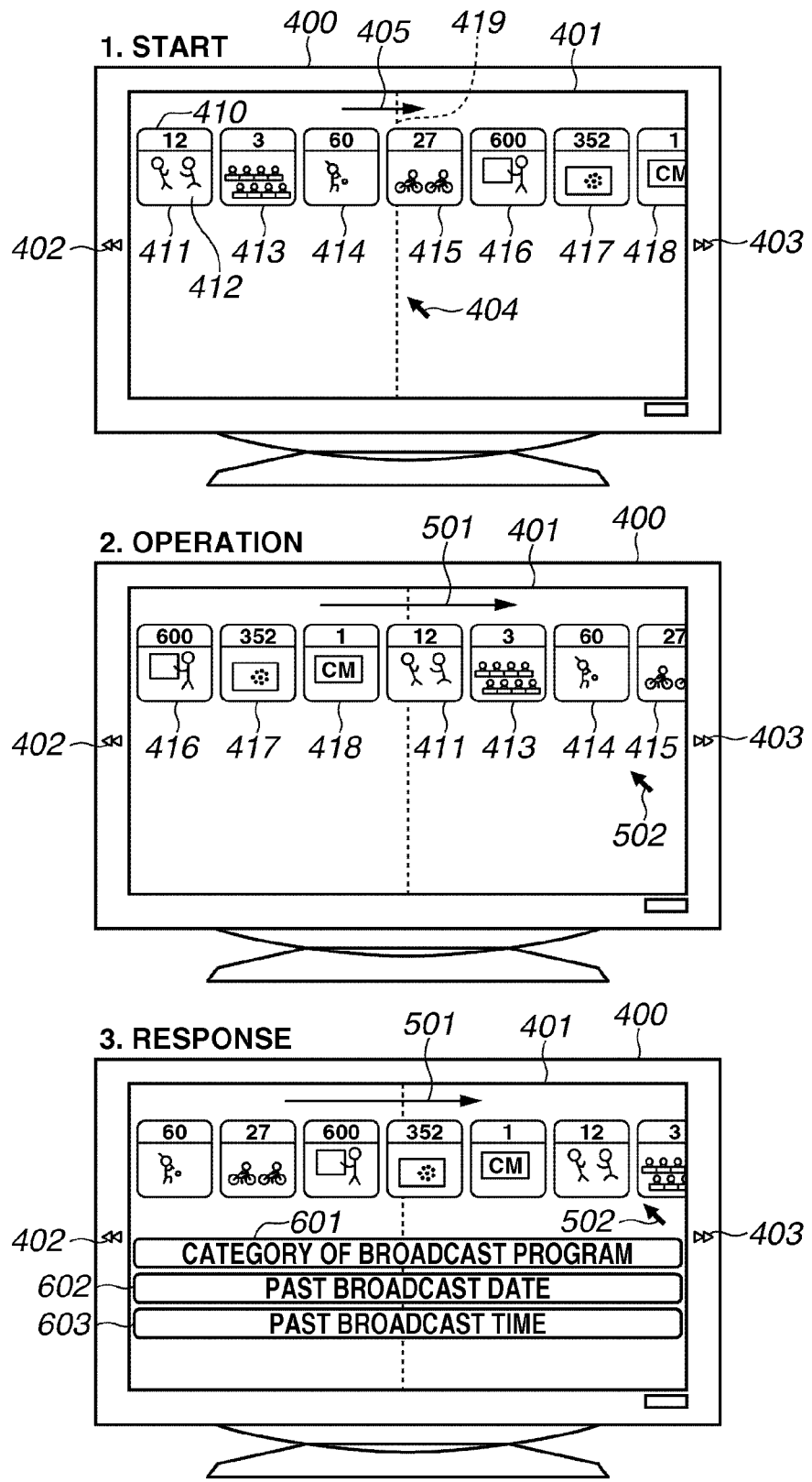
FIG. 4 illustrates an example of a display screen according to an exemplary embodiment of the present invention.

In the present exemplary embodiment, the "image indicating the method for grouping the contents" refers to images displayed as grouping method candidates 601 through 603, which is displayed on a screen "3. response" illustrated in FIG. 4.

As illustrated in FIG. 4, the grouping method candidate 601 displays a text string "category of broadcast program". The grouping method candidate 602 displays a text string "past broadcast date". The grouping method candidate 603 displays a text string "past broadcast time".

It is also useful if the image generation unit 103 previously generates an image indicating the content grouping method. The grouping method candidate image will be described in detail below.

In step S207, the image generation unit 103 determines whether the user has determined a grouping method. More specifically, if the user has selected a specific image from among the plurality of images (the grouping method candidates 601, 602, and 603) indicating the content grouping method, which is displayed in step S206, then the image generation unit 103 determines that the user has determined the method for grouping a plurality of contents.

As described above, the present exemplary embodiment groups a plurality of contents according to the category of broadcast programs (corresponding to the grouping method candidate 601), the broadcast date (corresponding to the grouping method candidate 602), and the broadcast start time (corresponding to the grouping method candidate 603). However, the content grouping method is not limited to the present exemplary embodiment.

If it is determined that the user has determined the grouping method (Yes in step S207), then the processing advances to step S208. On the other hand, if it is determined that the user has not determined a grouping method yet (No in step S207), then the processing advances to step S215.

In step S208, the image generation unit 103 generates a group classification information image, which is to be displayed on the display unit 122, according to the content grouping method determined in step S207.

Furthermore, the image generation unit 103 outputs the generated group classification information image to the display control unit 105. Then, the processing advances to step S209.

In the present exemplary embodiment, a "group classification information image" refers to an image generated to allow the user to easily recognize the group classification information described above. More specifically, if the category of broadcast programs is selected as the grouping method, the image generation unit 103 generates a group classification information image (text string), such as "baseball", "quiz show", "weather forecast", or "domestic news".

In step S209 (display changing processing), the display control unit 105 displays the group classification information image received from the image generation unit 103 on the display screen of the display unit 122. More specifically, when content images are currently displayed, if it is determined that the scroll speed is equal to or higher than the first predetermined value in step S205, and if the user has determined the grouping method in step S207, then the display control unit 105 displays group classification information images corresponding to a plurality of contents instead of displaying the content images.

More specifically, the display control unit 105 determines whether to display the group classification information so that the group classification information (group classification information images) corresponding to the plurality of contents is displayed when the scroll speed reaches a predetermined speed.

Figure 5:
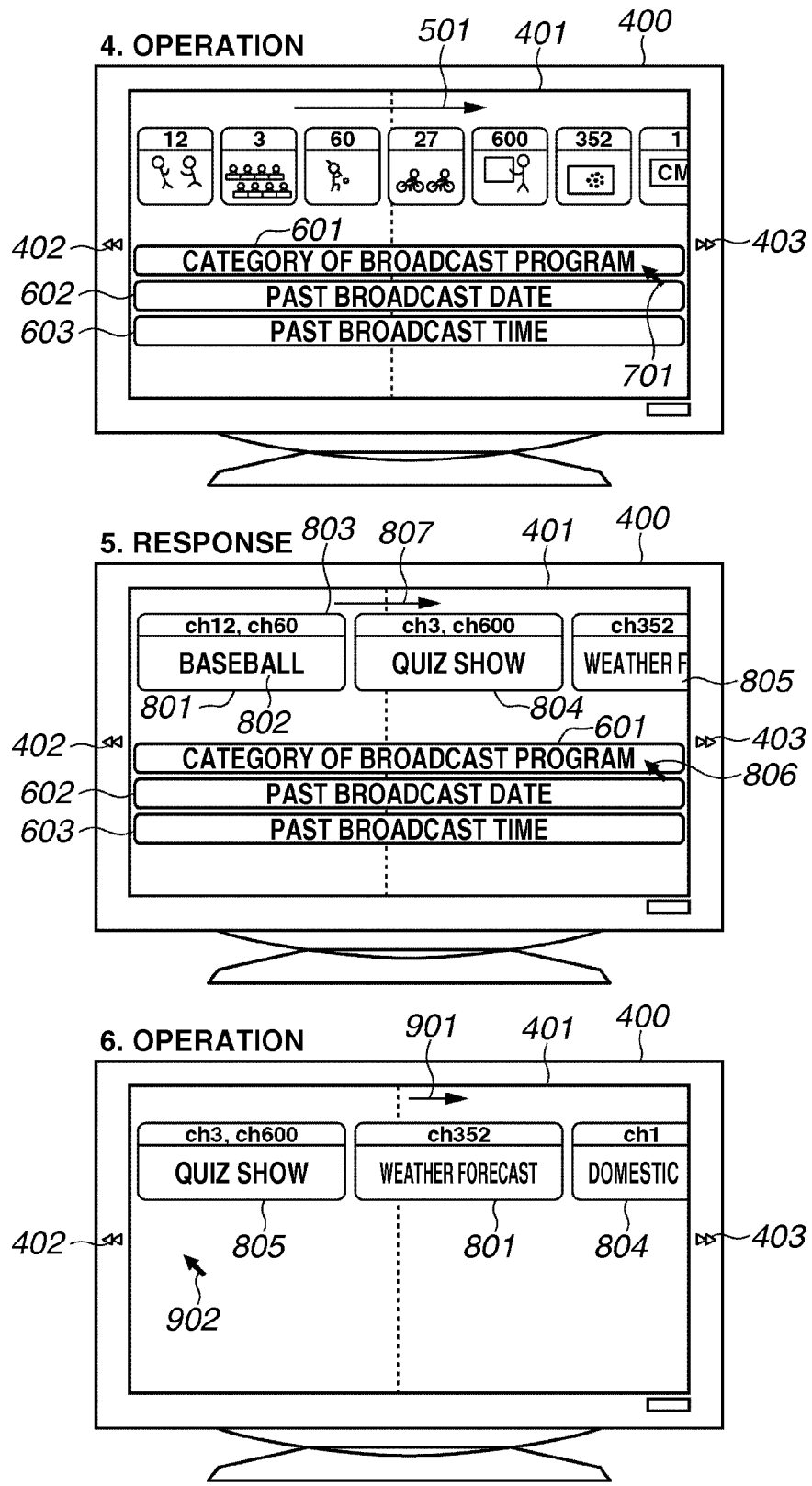
FIG. 5 illustrates an example of a display screen according to an exemplary embodiment of the present invention.

In an example illustrated in FIG. 5, group classification information images 801, 804, and 805, which are examples of the group classification information images displayed in step S209, are displayed on a screen "5. response".

In the example illustrated in FIG. 5, the group classification information related to the category of broadcast programs is displayed because the user has determined in step S207 that the contents are to be grouped according to the category of broadcast programs by selecting the grouping method candidate 601 via the "4. operation" screen illustrated in FIG. 5.

In the present exemplary embodiment, the group classification information image is a still image. However, a moving image or an image including audio data can be used as the group classification information image.

In addition, in the present exemplary embodiment, the group classification information is an image including a text string. However, the group classification information can include an illustrated image in combination with a text string.

Furthermore, in the present exemplary embodiment, the display control unit 105 reduces the scroll speed if the group classification level is raised in step S209. More specifically, if the first predetermined value is set at too high a value for the user to verify the content of each displayed image and if the scroll speed remains likewise high even when the group classification level is changed, then the user may not verify the group classification information indicated by newly displayed group classification information images.

Accordingly, in the present exemplary embodiment, if the group classification level is raised, then the display control unit 105 reduces the scroll speed so that the user can normally verify the contents of the group classification information images to be newly displayed.

More specifically, the display control unit 105 reduces the scroll speed when the user gives the instruction for displaying the group classification information. However, it is also useful if the display control unit 105 does not change the scroll speed according to the change in the group classification level.

In addition, if the group classification information images are displayed and if it is determined in step S205 that the scroll speed is equal to or higher than the first predetermined value, then the display control unit 105 displays the group classification information image corresponding to the group classification information according to the group classification level higher than the current group classification level.

It is also useful if a value that differs according to the current group classification level is used as the first predetermined value. In addition, it is also useful that a specific constant value is used as the first predetermined value if the display control unit 105 reduces the scroll speed when the group classification level is raised as described above.

Now, the group classification level and the group classification information corresponding to the group classification level will be described in detail below.

Suppose, for example, that the group classification information images corresponding to the groups "domestic news broadcast program", "international news broadcast program", "weather forecast", "baseball", "football", "tennis", "sumo wrestling", "quiz show", and "health information broadcast program" are displayed according to the current group classification level.

In this case, if the group classification level is further raised, the display control unit 105 displays the group classification information corresponding to the groups "news", "sports", "variety show", for example.

As described above, as the group classification level becomes higher, the number of the group classification information to be displayed becomes smaller. More specifically, when the scroll speed reaches a first speed (the first predetermined value), then the display control unit 105 displays first group classification information (the group classification information image) corresponding to a plurality of contents.

When the scroll speed reaches a second speed, which is faster than the first speed (the first predetermined value), the display control unit 105 displays second group classification information about the group classification level, which is higher than the first group classification information and corresponds to a plurality of contents.

If the group classification level is raised while the group classification information is displayed as described above, it is also useful if the processing in steps S206 and S207 is omitted.

After the display control unit 105 has displayed the group classification information images in step S209, the processing advances to step S215. On the other hand, if it is determined that the user has given an instruction for reducing the scroll speed ("Reduced" in step S203), then the processing advances to step S210. In step S210, the boundary determination unit 104 determines whether the current group classification level is the lowest group classification level.

If each of the images that is scroll-displayed corresponds to each of the contents stored on the content storage unit 121 in the one to one relation as described above, the boundary determination unit 104 determines that the current group classification level is the lowest group classification level. In other words, if a group classification information image is not displayed but a content image is displayed, the boundary determination unit 104 determines that the current group classification level is the lowest group classification level.

If it is determined that the current group classification level is the lowest group classification level (Yes in step S210), then the processing advances to step S213. On the other hand, if it is determined that the current group classification level is not the lowest group classification level (No in step S210), then the processing advances to step S211.

In step S211, the boundary determination unit 104, determines whether the scroll speed is equal to or lower than a second predetermined value. If it is determined that the scroll speed is equal to or lower than the second predetermined value (Yes in step S211), then the processing advances to step S212. On the other hand, if it is determined that the scroll speed is higher than the second predetermined value (No in step S211), then the processing advances to step S215.

In the present exemplary embodiment, a "second predetermined value" refers to a threshold value of the scroll speed used in lowering the group classification level. It is also useful if a value that differs according to the current group classification level is used as the second predetermined value.

In step S212, the display control unit 105 lowers the current group classification level. More specifically, when the group classification information images corresponding to the highest group classification level are displayed, the display control unit 105 displays the group classification information images corresponding to the second highest group classification level.

On the other hand, when the group classification information images corresponding to the group classification level one stage higher than the lowest group classification level, the display control unit 105 changes the display from the display of the group classification information images to the display of the content images by executing the processing in step S212. After executing the processing for lowering the group classification level by the display control unit 105 in step S212, then the processing advances to step S215.

In lowering the group classification level in step S212, the display control unit 105 sorts out the content images or the group classification information images, which are displayed according to the changed group classification level, according to the group classification level that has been used in grouping the contents.

More specifically, if the display images changes from the group classification information images to the content images by executing the processing in step S212, the plurality of contents is displayed in such an order that content images of the contents corresponding to the same group classification information are displayed adjacent to each other.

In other words, when the group classification information (group classification information images) is displayed and if the scroll speed reaches a predetermined speed in this state, then the display control unit 105 discontinues the display of the group classification information images and displays the contents (content images) in the order determined according to the group classification information images. The predetermined speed corresponds to the speed of scroll which is equal to or less than the second predetermined speed.

The method of sorting the order of display, which is executed when the group classification level is lowered, will be described in detail below.

In the present exemplary embodiment, it is supposed that when the scroll display is started, the content images are displayed in the order in which the images were stored on the content storage unit 121. More specifically, the order of displaying the content images is not sorted according to the category of broadcast programs at the start of the scroll. On the other hand, the user has previously selected the "category of the broadcast programs" as the content grouping method.

In this case, group classification information images corresponding to groups such as "domestic news broadcast program", "international news broadcast program", "weather forecast", "baseball", "football", "tennis", "sumo wrestling", "quiz show", and "health information broadcast program" are displayed on the display screen.

If the content images are to be displayed by the processing in step S212, the content images are sorted so that the content images are displayed in the order according to the category of broadcast programs as described above. In the example illustrated in FIG. 5, on the screen "5. response", the contents belonging to the "baseball" category (channels 12 and 60) and the contents belonging to the "quiz show" category (channels 3 and 600) have been sorted.

On the other hand, if it is determined that the current group classification level is the lowest group classification level (Yes in step S210), then the processing advances to step S213.

In step S213, the display control unit 105 determines whether the user has designated the moving image content to be viewed by an operation via the operation unit 120. If it is determined that the user has designated the moving image content to be viewed (Yes in step S213), then the processing advances to step S214. On the other hand, if it is determined that the user has not designated the moving image content yet (No in step S213), then the processing advances to step S215.

In step S214, the display control unit 105 reads the designated moving image content from the content storage unit 121 and displays the read moving image contents on the display unit 122. Then, the display control unit 105 ends the processing related to the scroll-display.

More specifically, if it is determined that the current group classification level is the lowest group classification level in step S210, the group classification level cannot be further lowered even when the scroll speed is low. Accordingly, the processing advances to processing for determining whether the user has selected the content to view.

In the present exemplary embodiment, the user can designate a content to view when content images are displayed (when the group classification level is the lowest group classification level). Specifically, in the present embodiment, if the scrolling speed is increased by the user, the images that represent individual broadcast programmes are effectively merged into the larger (or higher level) groupings. Then, if the scrolling speed is decreased, the groups split up (from "sports" to "baseball", "football", etc.) and keep splitting up in to the lower hierarchical groups until the lowest group is attained, which may be a single channel or programme (or "content item"). At this stage, the user may choose the programme to view, as the lowest group has all programmes separated out into the individual programmes and it is easiest for the user to go directly to the desired channel.

However, the present exemplary embodiment is not limited to this. More specifically, it is also useful if the user designates the displayed group classification information image by operating the operation unit 120 to display the group classification information image corresponding to the group classification level one stage lower than the group classification information.

In addition, it is also useful if the user can designate a content image from among the content images corresponding to the group classification information designated by the user via the operation unit 120.

Now, the user operation from the operation unit 120 and the change in the display screen of the display unit 122 executed according to the user operation will be described in detail below with reference to related drawings.

Figure 3:
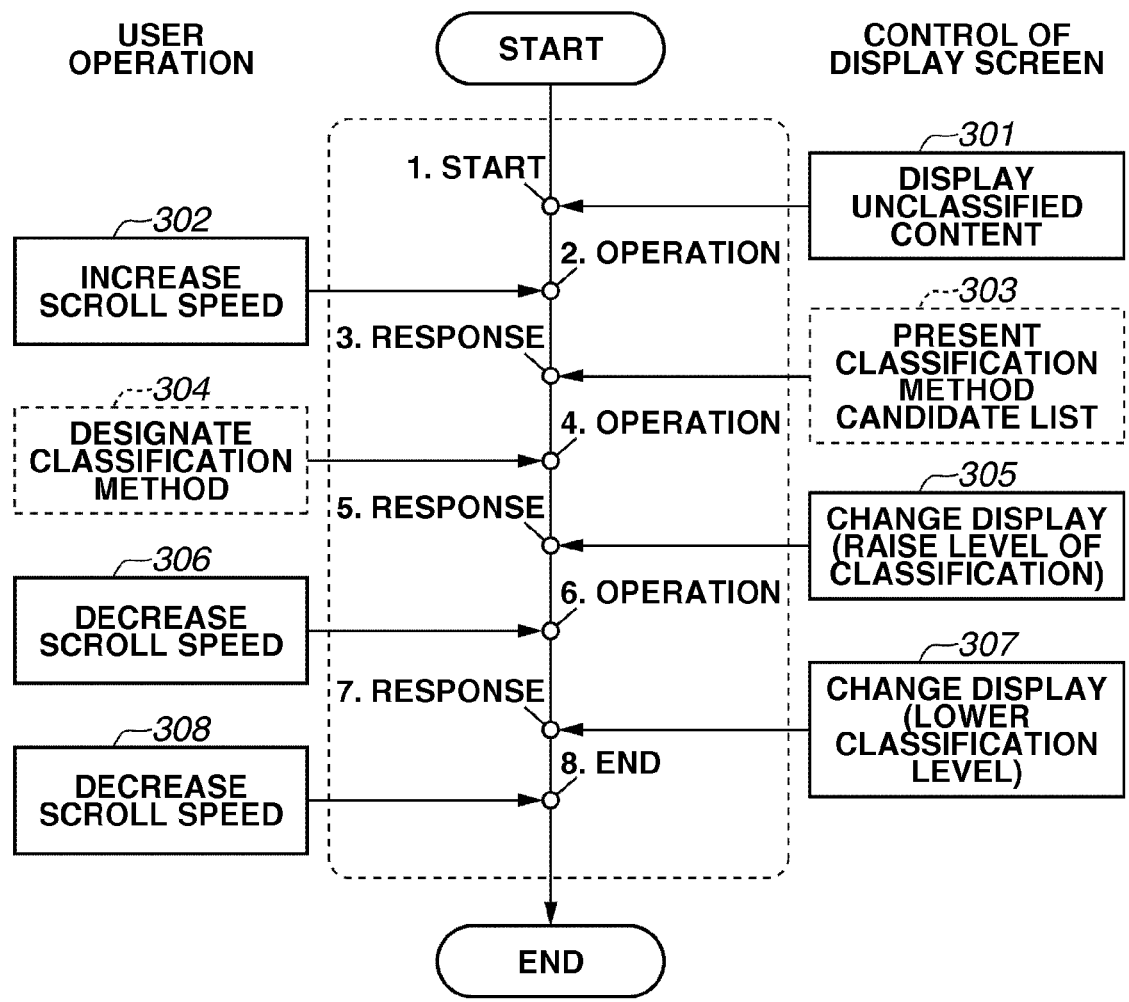
FIG. 3 illustrates examples of operations of a display screen according to an exemplary embodiment of the present invention.

FIG. 3 illustrates an example of a user (content viewing user) operation and the change of the screen displayed on the display unit 122 executed according to the user operation. Referring to FIG. 3, each operation illustrated in FIG. 3 within a dotted-line edge-rounded rectangle corresponds to each of display screens illustrated in FIGS. 4 through 6.

More specifically, the screen displayed during the operation "1. start" illustrated in FIG. 3 corresponds to the display screen "1. start" illustrated in FIG. 4. Similarly, the screen displayed during the operation "2. operation" illustrated in FIG. 3 corresponds to the display screen "2. operation" illustrated in FIG. 4. In the similar manner, each of operations "3. response" through "8. end" illustrated in FIG. 3 corresponds to each corresponding display screen illustrated in FIGS. 4 through 6. A display unit 400 illustrated in each of FIGS. 4 through 6 corresponds to the display unit 122 illustrated in FIG. 1.

In the present exemplary embodiment, when the user executes the scroll operation of the contents to be viewed, the processing illustrated in FIG. 3 starts. In the example illustrated in FIG. 3, in the operation "1. start" (processing 301), the display control unit 105 displays content images.

More specifically, the display control unit 105 scroll-displays the content images when the processing starts. At this timing, the display screen "1. start" illustrated in FIG. 4 is displayed on the display screen 401.

In the example illustrated in FIG. 4, each of content images 411 and 413 through 418 are displayed on the display screen 401. In the present exemplary embodiment, a "content image" refers to a thumbnail image of a plurality of moving image contents.

Furthermore, a content image corresponds to a moving image content stored on the content storage unit 121 in a one to one relation. The user can designate a moving image content to view by designating a content image. As described above, the content stored on the content storage unit 121 is not limited to moving-image content.

In the example illustrated in FIG. 4, the left arrow 402 has a function of applying a leftward positive acceleration to the scroll speed when the user moves the mouse pointer 404 leftward across the vertical centre line 419 on the display screen 401. In addition, the right arrow 403 has a function of applying a rightward positive acceleration to the scroll speed when the user moves the mouse pointer 404 rightward across the vertical centre line 419 on the display screen 401.

In addition, as indicated with the content image 411 in FIG. 4, a channel number of a moving image content is provided in an upper portion of a content image. In the present exemplary embodiment, a "channel number" refers to a number for identifying a provider of the moving image content.

Furthermore, a representative image 412 of the moving image contents is provided below the channel number. As described above, each content image includes a channel number and a moving image content representative image.

At the start of the scroll display, the content images are displayed in the order in which the images were stored on the content storage unit 121. However, the configuration of the content images is not limited to this. More specifically, it is also useful if the order of channel numbers is used as the order of the content images to be displayed.

The moving image content corresponding to the content image 411 includes attribute information, such as "sports", "sumo wrestling", "Mar. 3, 2006", and "12:00-15:00". The attribute information "sports" and "sumo wrestling" is attribute information used for classifying and grouping the contents according to the category of broadcast program. The attribute information "sports" is attribute information in the group classification level one stage higher than the group classification to which the attribute information "sumo wrestling" corresponds.

The attribute information "Mar. 3, 2006" indicates the past broadcast date of the moving image content corresponding to the content image 411. The attribute information "12:00-15:00" indicates the past broadcast time of the moving image content.

Each of the attribute information described above is used to classify and group the contents according to the past broadcast date and the past broadcast time. A channel number can also be used as the attribute information for classifying and grouping the contents.

FIG. 8A illustrates an example of attribute information included in a moving image content corresponding to each content image illustrated in FIG. 4. More specifically, in the present exemplary embodiment, attribute information 1 and 2 illustrated in FIG. 8A is used as the attribute information for grouping the contents according to the category of broadcast programs.

Attribute information 3 is used for grouping the contents according to the past broadcast date. Attribute information 4 is used for grouping the contents according to the past broadcast time. In the example illustrated in FIG. 8A, the content images are displayed according to the order of content image numbers illustrated in FIG. 8A.

In the present exemplary embodiment, seven content images are scroll-displayed. However, the present exemplary embodiment is not limited to this. Furthermore, in the present exemplary embodiment, the content images of the seven contents, which are candidates of the content to view, are continuously displayed. However, the present exemplary embodiment is not limited to this. More specifically, it is also useful if the content image to be displayed is appropriately changed according to the user's scroll operation.

When the user executes an operation for increasing the scroll speed via the operation unit 120 on the display screen "2. operation" (corresponding to processing 302 illustrated in FIG. 3), the display control unit 105 executes control to increase the scroll speed. In the present exemplary embodiment, the display control unit 105 executes control to increase the scroll speed according to a user operation for increasing the scroll speed.

While the above-described scroll speed increasing operation is executed, for example, the display screen "2. operation" illustrated in FIG. 4 is displayed. In the present exemplary embodiment, the length of an arrow provided in an upper portion of the display screen 401 corresponds to the level of the scroll speed.

In the example illustrated in FIG. 4, the length of an arrow 501 illustrated in the display screen "2. operation" is longer than an arrow 405 illustrated in the display screen "1. start", which indicates that the scroll speed has increased. The fixed arrow (405 and 501), which is displayed in a centre in the upper portion of the display screen, remains displayed regardless of the content-image scroll-display operation.

If it is determined by the boundary determination unit 104 that the scroll speed has become equal to or higher than the first predetermined value illustrated in FIG. 2, then the display control unit 105 displays a list of the grouping method candidates, which includes the grouping method candidates 601 through 603 (the processing 303 in FIG. 3).

More specifically, as illustrated in the example in FIGS. 3 and 4, the display screen "3. response" is displayed in this case, which includes the grouping method candidates 601 through 603 ("category of broadcast program", "past broadcast date", and "past broadcast time").

In processing 304 (FIG. 3), the user can use a mouse (icon 502) to choose one from the list of grouping method candidates, which is displayed as described above, to select and designate the method for grouping the plurality of contents.

In the present exemplary embodiment, as illustrated in the display screen "4. operation" in FIG. 5, the user has selected the grouping method "category of broadcast program" from among the grouping methods included in the displayed grouping method list by using a mouse pointer 701.

As described above, in the present exemplary embodiment, when the scroll speed reaches the first predetermined value, the user can change and select the method for grouping the plurality of contents. By displaying the grouping method list as described above, the present exemplary embodiment can allow the user to select the grouping method as desired according to the scroll speed. However, the present exemplary embodiment is not limited to this.

More specifically, it is also useful if a previously set grouping method is used or if a grouping method that was used in past operations is used.

After the grouping method has been selected in the processing 304 in FIG. 3, the display control unit 105 changes the group classification level in processing 305. More specifically, the display control unit 105 changes the display from the display of content images to the display of group classification information images, as illustrated in the display screen "5. response" (FIG. 5).

As illustrated in FIG. 5, when the user selects the grouping method "category of broadcast program" as the method for grouping the plurality of contents, the display control unit 105 groups the plurality of contents by using the attribute information 2 (FIG. 8B) and displays the group classification information image corresponding to the grouped contents.

The attribute information 2 is used to group the contents according to the category of broadcast program as described above. In addition, the attribute information 1 is also used to group the contents according to the category of broadcast program. However, the attribute information corresponds to the group classification at a level rougher than the group classification level to which the attribute information 2 corresponds. Accordingly, the display control unit 105 groups the plurality of contents according to the attribute information 2.

More specifically, if the user executes an operation for further increasing the scroll speed in this state, the display control unit 105 groups the plurality of contents by using the attribute information 1. The method for grouping the plurality of contents by using the attribute information 1 will not be described in detail here.

In the example illustrated in FIG. 5, in the operation "5. response", the length of an arrow 807, which indicates the scroll speed, is shorter. More specifically, the arrow 807, whose length is shorter as described above, indicates that the display control unit 105 has reduced the scroll speed because the group classification level has been raised.

As described above, the group classification level when the content images are displayed is the lowest group classification level. The display control unit 105 has raised the group classification level by changing the display from the display of the content images to the display of the group classification information images. The present exemplary embodiment reduces the scroll speed when the group classification level is raised for the following reasons.

If the first predetermined value is set at too high a value for the user to verify the content of each displayed image, then the user may not verify the group classification information indicated by newly displayed group classification information images.

Accordingly, in the present exemplary embodiment, if the group classification level is raised, then the display control unit 105 reduces the scroll speed so that the user can normally verify the contents of the group classification information images to be newly displayed.

If the group classification level is raised, the number of group classification information images displayed after the group classification level is changed becomes smaller than the number of the content images before the group classification level is changed. This is because several groups in the lower group classification level have merged into a smaller number of larger groups in the higher level.

In the example illustrated in FIG. 5, the group classification information images corresponds to the groups "baseball", "quiz show", and "weather forecast" in the display screen "5. response". If the user scrolls the display screen, the other group classification information images corresponding to groups "triathlon" and "domestic news" are appropriately displayed.

After having changed the group classification level in the processing 305 (FIG. 3) and if the user executes an operation for reducing the scroll speed via the operation unit 120 (processing 306), then the display screen "6. operation" illustrated in FIG. 5 is displayed on the display screen 401.

More specifically, in the display screen "6. operation", the length of an arrow 901, which indicates the scroll speed, is even shorter than length of the arrow 807 illustrated in the display screen "5. response". Accordingly, the arrow 901 indicates that the scroll speed has been reduced.

As described above, after the user has selected the grouping method, the present exemplary embodiment does not display the grouping method candidate list. Accordingly, the present exemplary embodiment can simplify the display screen. In addition, with the above-described configuration, the present exemplary embodiment can prevent the user from newly selecting a grouping method by mistake.

However, the present exemplary embodiment is not limited to this. More specifically, it is also useful if the grouping method candidate list is displayed while the group classification information images are displayed so that the user can change the content grouping method. With this configuration, if the user has selected a wrong grouping method, the user can reattempt to set a desired grouping method.

After the scroll speed is reduced in the processing 306, if it is determined that scroll speed has reached the second predetermined value, then the present exemplary embodiment reduces the group classification level in processing 307. At this timing, the display screen "7. response" illustrated in FIG. 6 is displayed.

Figure 6:
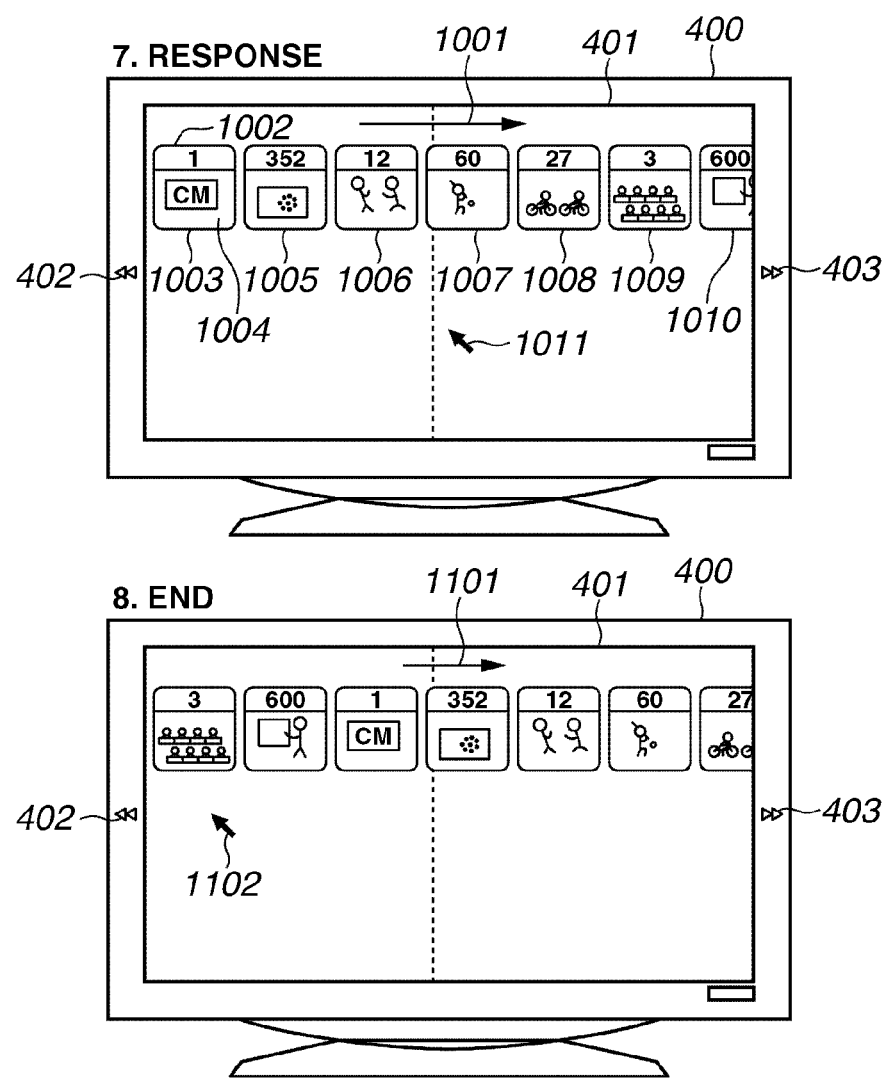
FIG. 6 illustrates an example of a display screen according to an exemplary embodiment of the present invention.

As illustrated in FIG. 6, the order of displaying the content images is different from the order of displaying the content images in the display screen "1. start" illustrated in FIG. 4. More specifically, if the scroll speed is increased, the content images to be displayed are sorted according to the grouping method selected by the user in the processing 304 illustrated in FIG. 3 and the content images are displayed according to the order of sorting the content images.

FIG. 8B illustrates the order of displaying the content images displayed in the display screen "7. response" (FIG. 6) and the attribute information thereof. Referring to FIG. 8B, the order of displaying the content images illustrated in FIG. 8B is different from that illustrated in FIG. 8A.

More specifically, in the present exemplary embodiment, after the contents are grouped according to the grouping method "category of broadcast program" and the display has changed from the display of the group classification information images to the display of the content images, the content images are sorted according to the attribute information 2, which indicates the category of broadcast program.

In the present exemplary embodiment, the content images are sorted according to the category of broadcast program selected by the user as the content grouping method. On the other hand, the contents including the attribute information for the same category of broadcast program are sorted according to the attribute information 3 (the past broadcast date) in ascending chronological order.

More specifically, as to the content images 413 and 416, which have the same attribute information 2, the present exemplary embodiment sorts the display order so that the content image 413, whose broadcast date is earlier, is displayed prior to the content image 416.

As described above, the present exemplary embodiment can sort the content image according to attribute information different from the attribute information included in the content images. Accordingly, the present exemplary embodiment can allow the user to easily select a content to view.

However, the present exemplary embodiment is not limited to this. More specifically, it is also useful if another attribute information such as a channel number and the date and time of storage of the content image on the content storage unit 121 are used instead of using the attribute information 2.

Further, in the display screen "7. response" illustrated in FIG. 6, the length of an arrow 1001, which indicates the scroll speed, is longer than the length of the arrow 901, which is displayed on the display screen "6. operation", which indicates that the display control unit 105 has increased the scroll speed when the group classification level is lowered. The present exemplary embodiment executes the above-described processing for the following reasons.

If the second predetermined value is set at such a low value that the scroll may almost stop, then the user may desire to quickly verify the newly displayed content images or the group classification information images whose group classification level has been lowered. Accordingly, if the group classification level is lowered, the display control unit 105 increases the scroll speed so that the user can quickly verify the newly displayed content images or the group classification information images whose group classification level has been lowered.

Further, if the user executes an operation for further reducing the scroll speed from the scroll speed applied in the processing 307 illustrated in FIG. 3, then the display screen "8. end" illustrated in FIG. 6 is displayed. As illustrated in FIG. 6, the length of an arrow 1101, which indicates the scroll speed, is shorter. Accordingly, it is known that the scroll speed has been reduced.

In the above-described manner, the present exemplary embodiment displays the content images sorted according to the selected grouping method. Accordingly, the user can effectively select a moving image content to view.

As described above, in the present exemplary embodiment, when the scroll speed for scroll-displaying the content images reaches the first predetermined value, the display control apparatus 100 displays the list of grouping method candidates including candidates of the grouping methods for grouping a plurality of contents. In addition, the display control apparatus 100 groups the contents according to the group classification information corresponding to the plurality of contents according to the selected grouping method and displays the group classification information images corresponding thereto.

Further, after the user has executed an operation for increasing the scroll speed and when the scroll speed reaches a predetermined value, the display control apparatus 100 groups the contents by using the group classification information corresponding to a higher group classification level according to the selected grouping method. Furthermore, the display control apparatus 100 displays the group classification information images thereof. It is also useful if a value that varies according to the current group classification level or a constant value (the first predetermined value) is used as the predetermined value.

Furthermore, if, after that, the user executes an operation for reducing the scroll speed and if the scroll speed reaches the second predetermined value, then the display control apparatus 100 according to the present exemplary embodiment reduces the group classification level of the group classification information images currently displayed.

If it is determined that the current group classification level is a group classification level one stage higher than the lowest group classification level, then the display control apparatus 100 according to the present exemplary embodiment executes processing for reducing the group classification level and changes the display to the display of content images.

As described above, in the present exemplary embodiment, the display control apparatus 100 changes the group classification level according to the scroll speed. In addition, the order of displaying the group classification information images or the content images, which are displayed when the group classification level is lowered, is sorted according to the attribute information used in the grouping processing.

With the above-described configuration, the present exemplary embodiment can allow the user to effectively select a content to view from among a plurality of contents.

In other words, according to the present exemplary embodiment having the configuration described above, the user can change the group classification level interdependently with the instruction for increasing or reducing the scroll speed.

In addition, the present exemplary embodiment allows the user to select the method for grouping the contents when the scroll speed reaches a predetermined value. Accordingly, the present exemplary embodiment can allow the user to sort the content images in the order according to a desired grouping method.

Now, a second exemplary embodiment of the present invention will be described in detail below. In the following description, a configuration of the present exemplary embodiment different from that of the first exemplary embodiment will be primarily described.

In the first exemplary embodiment, when the scroll speed reaches the first predetermined value, the display control apparatus 100 displays the grouping method candidate list to allow the user to select a desired grouping method. In the present exemplary embodiment, a predetermined grouping method is used.

In the present exemplary embodiment, when the scroll speed reaches a predetermined value, the display control apparatus 100 immediately changes the group classification level according to a predetermined grouping method.

The relationship between the scroll speed and the changing of the group classification level at each timing according to the present exemplary embodiment will be described in detail below with reference to FIG. 7. FIG. 7 illustrates the change of the group classification level, which is executed according to the change in the scroll speed, in the chronological order (as can be determined by the time elapsed being on the x-axis).

Referring to FIG. 7, the scroll speed is taken on a vertical axis 1201 while timing is taken on a horizontal axis 1211. An initial state 1212 indicates a state immediately before the contents are scrolled. In the initial state 1212, content images that have not been grouped are displayed.

If the user moves the mouse pointer 404 rightward across the vertical centre line 419 on the display screen 401, then the rightward scroll speed increases as indicated with a line 1220 in FIG. 7. The display on the line 1220 corresponds, for example, to the shift of the display screen from the display screen "1. start" (FIG. 4) to the display screen "2. operation" (FIG. 4).

In the above-described first exemplary embodiment, when the scroll speed reaches the first predetermined value, the display control unit 105 displays the grouping method candidate list. On the other hand, in the present exemplary embodiment, the display control unit 105 does not display a grouping method candidate list even when the scroll speed reaches a predetermined value.

More specifically, when the scroll speed reaches a predetermined value A 1202 at timing A 1213, the display control unit 105 changes both the content grouping level and the scroll speed. In the present exemplary embodiment, the display control unit 105 changes the display from the display of the content images (the lowest group classification level) to the display of the group classification information images. The group classification information images correspond to the content image groups such as "baseball", "quiz show", "weather forecast", or "domestic news".

At the timing A 1213, the display screen "5. response" (FIG. 5) is displayed but in the present exemplary embodiment, the grouping method candidate list including the grouping method candidates 601 through 603 is not displayed.

As indicated with a line 1221, i.e., during a time period from timing A to B 1214, the user increases the content scroll speed to verify all the group classification information images. As indicated with a change at time B 1214 and a line 1222, i.e., during a time period from timing B to C, the user reduces the content scroll speed. Then, the scroll speed reaches a predetermined value B 1205 at the timing C. In the present exemplary embodiment, the predetermined value B 1205 is equivalent to the second predetermined value described above in the first exemplary embodiment with reference to FIG. 2.

The display control unit 105 changes the group classification level and the scroll speed at the timing C 1215. More specifically, at the timing C 1215, the display control unit 105 changes the display from the display of the group classification information images to the display of content images and increases the scroll speed. At this timing, for example, the display screen "7. response" illustrated in FIG. 6 is displayed. The content images displays at this timing have been sorted according to a predetermined grouping method.

The content images are displayed in the order equivalent to the order of the groups corresponding to the group classification information images displayed during the time period from the timing A to C (i.e., in the order of "baseball", "quiz show", "weather forecast", and "domestic news in group") in the example illustrated in FIG. 4.

As illustrated with a line 1223 in FIG. 7, as the user reduces the scroll speed from the timing C 1215, the scroll display of the sorted content images stops at timing 1216. It is also useful, if the user selects a content image before stopping the scroll display, to display the content corresponding to the selected content image.

During the time period from the timing C 1215 to the scroll end timing 1216, which is indicated with the line 1223, the display screen is changed from the display screen "7. response" (FIG. 6) to the display screen "8. end" (FIG. 6).

In the present exemplary embodiment, a default content grouping method is previously set. When the scroll speed exceeds the predetermined threshold value, the display control apparatus 100 groups the contents by using the group classification information according to the previously set grouping method. However, the present exemplary embodiment is not limited to this. More specifically, it is also useful if a grouping method previously determined and set by another method is used.

In other words, it is also useful if a content grouping method that was used in the past processing is used. In this case, at the time the scroll display is started, the display control unit 105 displays the content images in the order of the channel number or in the order in which the images were stored in the content storage unit 121.

If the scroll speed exceeds the predetermined value after that, the display control apparatus 100 groups the contents according to the previously set grouping method and displays the group classification information images. With the above-described configuration, the present exemplary embodiment can excuse the user from executing an operation for selecting a grouping method.

Furthermore, it is also useful if the image generation unit 103 according to the present exemplary embodiment generates a group classification information image according to the previously set grouping method while the display control unit 105 displays the content images. In addition, it is also useful if the display control unit 105, if it is determined that the scroll speed has reached the first predetermined value, displays the group classification information images that has previously been generated by the image generation unit 103.

In the above-described manner, the present exemplary embodiment can reduce the time taken from when the user executes the operation for displaying the group classification information images until when the group classification information images are actually displayed.

In the first and the second exemplary embodiments, the display control apparatus 100 lowers the group classification level as the scroll speed is reduced and the user can select a content to view when the group classification level reaches the lowest group classification level. However, the present exemplary embodiment is not limited to this.

More specifically, it is also useful if the following configuration is applied. When the display control unit 105 receives an input signal for determining the group classification information while the group classification information (group classification information images) is displayed, the display control unit 105 displays the contents (content images) corresponding to the determined group classification information. For example, if the group classification information "baseball" is selected, the display control unit 105 displays the contents corresponding thereto.

With the above-described configuration, the present exemplary embodiment can allow the user to effectively select a content to view if the attribute information of the content to view is previously known. In this case, it is also useful if the group classification information images that have not been selected are deleted from the display screen.

With the above-described configuration, the present exemplary embodiment can effectively select a content to view because the contents which the user is likely to select are displayed on the display screen.

In the first and the second exemplary embodiments, the display control apparatus 100 changes the group classification level for all the contents. However, the present exemplary embodiment is not limited to this. More specifically, it is also useful if the display control apparatus 100 changes only the group classification level for a part of the contents.

More specifically, when the user selects "sports" from the grouping method candidate list, the display control unit 105 classifies and groups the contents related to the group "sports" and displays the group classification information images thereof.

In other words, in the group classification level one stage higher than the lowest group classification level, "inter-high school baseball games", "professional baseball", "inter-high school football games", and "professional football" are displayed. If the group classification level is further raised, "baseball" and "football" are displayed.

In this case, either the contents not related to "sports" may be displayed or the display thereof may be deleted from the display screen. In the present exemplary embodiment, the contents not related to the selected grouping method are deleted from the display screen. Accordingly, the present exemplary embodiment can allow the user to effectively select a content to view.

Furthermore, it is also useful if, as to the contents related to the selected grouping method, the display control unit 105 displays the group classification information images and continues the display of the content images of the contents not related to the selected grouping method.

With this configuration, if the user search for a content to view by an elimination method, the present exemplary embodiment can display the content images of the contents which the user do not desire to view, in the form of group classification information images. Accordingly, the present exemplary embodiment can enable the user to effectively select a content to view.

In the first and the second exemplary embodiments, the user can scroll rightward or leftward. However, the present exemplary embodiment is not limited to this. More specifically, it is also useful if the vertical scroll or an angled-directional scroll is employed.

In the first and the second exemplary embodiments, the category of broadcast program and the broadcast start time are used as the content grouping method. However, the present exemplary embodiment is not limited to this. More specifically, it is also useful if the contents are classified and grouped according to "broadcast company", "broadcast program shooting location", "casts", "broadcast time", "broadcast date and time", "season of shooting", and "category of content" (for example, "politics", "economy", "information technology (IT)", or "family affairs") or a combination thereof.

In the first and the second exemplary embodiments, the scroll information acquisition unit 102 acquires the scroll speed according to the information about the scroll operation input by the user via the operation unit 120. However, the present exemplary embodiment is not limited to this. More specifically, it is also useful if the scroll information acquisition unit 102 acquires the scroll speed from the display unit 122.

For example, if the display control apparatus 100 and the display unit 122 are separately provided, it is also useful if the scroll information acquisition unit 102 requests the scroll speed from the display unit 122. In this case, the scroll information acquisition unit 102 can acquire the scroll speed according to the response from the display unit 122.

In the first and the second exemplary embodiments, the display control unit 105 changes the group classification level according to the scroll speed. However, the present exemplary embodiment is not limited to this. It is also useful if the display control unit 105 changes the group classification level according to the magnitude of the variation in the scroll speed instead of using the scroll speed itself.

More specifically, it is also useful that if the amount of variation of the scroll speed in a unitary time period reaches a predetermined value, the display control unit 105 displays the group classification information (group classification information images) of a plurality of contents.

Further, if the amount of variation of the scroll speed differs according to the coordinates of the mouse pointer 404 on the display screen, it is also useful if the scroll information acquisition unit 102 changes the group classification level according to the coordinates of the mouse pointer 404. With this configuration, the display control apparatus 100 can change the group classification level without acquiring the information about the scroll speed.

In the first and the second exemplary embodiments, the display control unit 105 changes the display from the display of the content images to the display of the group classification information images according to the scroll speed. However, the present exemplary embodiment is not limited to this.

More specifically, it is also useful if the display control unit 105 displays a result of sorting the content images according to the scroll speed. In other words, in this case, the image generation unit 103 acquires the attribute information of the plurality of contents stored on the content storage unit 121 from the attribute acquisition unit 101 and sorts (groups) the plurality of contents. Then, in step S209 (FIG. 2), the display control unit 105 displays the sorted content images (the result of the grouping).

In addition, if the display control unit 105 displays the result of sorting the content images according to the scroll speed, it is also useful if the display control unit 105 displays a frame that surrounds the plurality of contents per each group so that the user can easily recognize the sorted content images and clearly recognize that the contents are grouped.

More specifically, in step S208 (FIG. 2), the image generation unit 103 generates an image of a frame, which indicates that the content images have been grouped. In step S209 (FIG. 2), the display control unit 105 displays the sorted content images and the image of the frame that have been generated by the image generation unit 103.

As described above, in the present exemplary embodiment, the display control unit 105 continues the display of the content images and indicates the group of the contents by using the frame. With the above-described configuration, the present exemplary embodiment can enable the user to verify the contents even when the contents are grouped.

Now, a third exemplary embodiment of the present invention will be described in detail below. In the following description, a configuration of the present exemplary embodiment different from that of the first exemplary embodiment will be primarily described.

An example of the configuration of the display control apparatus 100 according to the present exemplary embodiment will be described in detail below with reference to FIG. 1.

Referring to FIG. 1, the operation unit 120 is a remote controller, for example, which can be operated by the user to execute a scroll operation or to designate a content to view. Information input from the operation unit 120 is input to the display control unit 105.

The display unit 122 displays a still image and a moving image according to the output from the display control unit 105. More specifically, the display unit 122 displays a reduced moving image and a thumbnail image of a moving image content as the content image according to the output from the display control unit 105. In addition, the display unit 122 displays the moving image content corresponding to the content image selected by the user.

Figure 9A:
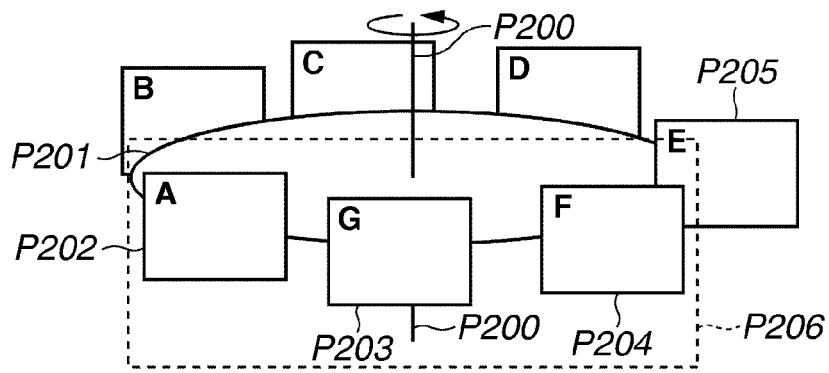
FIGS. 9A, 9B, and 9C illustrate an example of a state of display of a plurality of content images according to an exemplary embodiment of the present invention.
Figure 9B:
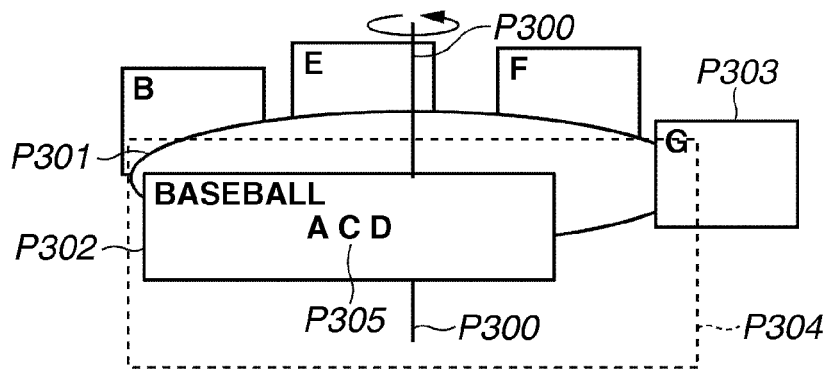
Figure 9C:
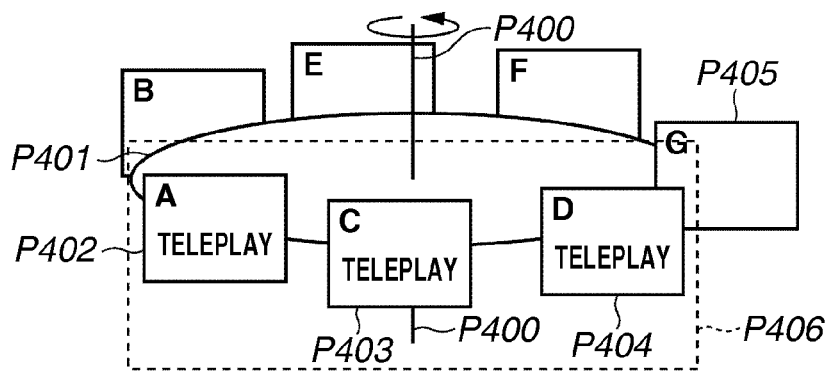

FIGS. 9A through 9C illustrate an example of the display of the content images on the display unit 122.

Referring to FIG. 9A, content images A through G are arranged on a circumference of an oval P201 around a central axis P200. In the example illustrated in FIG. 9A, the content images A through G do not indicate any content. However, in an actual operation, a reduced moving image or a thumbnail image of the moving image content, which is stored on the content storage unit 121, is displayed on each of the content images A through G.

In addition, each content image is scroll-displayed in the direction of an arrow illustrated in FIGS. 9A through 9C (i.e., in the counterclockwise direction in FIGS. 9A through 9C) according to the scroll operation by the user via the operation unit 120. However, the scroll is not limited to this direction.

Each image content and the moving image content stored on the content storage unit 121 correspond to each other in a one to one relation. The user can view desired moving-image content by selecting an image content to be viewed from among the plurality of displayed content images.

In the example illustrated in FIG. 9A, on the content images A, G, and F (P202 through P204), which are arranged within an output area P206, a reduced moving image, which is generated by reducing the corresponding moving-image content, is displayed. Furthermore, on each of the content images B through E, which is provided outside the output area P206, a still image (a representative image) of the corresponding moving image content is displayed.

When each content image is scrolled on the periphery of the oval P201 around the central axis P200 in the counterclockwise direction by the user's scroll operation, the content images displayed within the output area P206 are changed. More specifically, the content images displayed within the output area P206 are scrolled and moved outside the output area P206 from the right edge portion thereof by the user's scroll operation.

In the present exemplary embodiment, the content images scrolled and moved out of the output area P206 are changed from reduced moving images to still images. If the user executes a further scroll in this state, the content images enter the output area P206 again from the left edge portion of the output area P206. When the content images enter the output area P206 by the scroll, the content images are changed from the still images to the reduced moving images.

Thus, in the present exemplary embodiment, a content image is reduced as a reduced moving image of the corresponding moving image content while displayed within the output area P206, but is displayed as a still image while displayed outside the output area P206. However, the present exemplary embodiment is not limited to this. For example, the content image outside the output area P206 may be displayed as a solid black image.

In the present exemplary embodiment, the number of times the content images are displayed within the output area P206 is defined as a "number of times of display of content images". In other words, the number of times of display of content images is equivalent to the number of times a content image enters the output area P206 from outside thereof. More specifically, if the content image A, which has been displayed within the output area P206 at the start of the scroll, enters the output area P206 from the outside thereof another three times, so the number of times of display of the content image is four.

Further, in the present exemplary embodiment, when the user selects one content image from among those displayed within the output area P206 via the operation unit 120, the display unit 122 displays the moving image content corresponding to the content image. More specifically, the number of times of display of content image displayed within the output area P206 is "1" at the start of the scroll. After that, if the content image is scrolled out of the output area P206 and enters the output area P206 again, then the number of times of display of content images is incremented by 1. As a result, the number of times of display of content image is "2" at this timing.

In the present exemplary embodiment, the scroll information acquisition unit 102 repeats the above-described processing to acquire information about the number of times of display of content image.

The content storage unit 121 stores the moving image contents and the attribute information about each moving image content. The content storage unit 121 notifies, to the attribute acquisition unit 101, the attribute information of each moving image content according to a request from the attribute acquisition unit 101.

The attribute information stored on the content storage unit 121 will be described in detail below with reference to FIGS. 16A and 16B.

Referring to FIGS. 16A and 16B, rows A through G correspond to each of the content images A through G (FIG. 9). As illustrated in FIGS. 16A and 16B, each of the moving image contents A through G includes a content number, a channel number, and attribute information 1 through 4.

The attribute information 1 and 2 is information used for grouping the moving image contents according to the category of broadcast program. The attribute information 3 is used for grouping the moving image contents according to the past broadcast date. The attribute information 4 is used for grouping the moving image contents according to the past broadcast start time and the length of the reproduction time of the moving image content.

The attribute information can be previously added to the moving image content or can be added to the moving image content by each user. The content number includes the order of storing the moving image contents on the content storage unit 121. The channel number is used for identifying the source of the content (the provider) of each moving-image content item.

The content storage unit 121 outputs the data used for displaying the reduced moving images and thumbnail images of a plurality of moving image contents to the display control unit 105. Furthermore, when the user selects a content image, the content storage unit 121 outputs the data for displaying the corresponding moving image content to the display control unit 105.

In the example illustrated in FIG. 1, the attribute acquisition unit 101 acquires the attribute information about the moving image content. More specifically, the attribute acquisition unit 101 acquires the attribute information corresponding to a plurality of contents stored on the content storage unit 121.

The scroll information acquisition unit 102 acquires the scroll information. More specifically, the scroll information acquisition unit 102 acquires the information about the number of times of display of the content image from the display control unit 105.

As described above, in the present exemplary embodiment, the "number of times of display of content image" refers to the number of times the content image enters the output area P206 from outside thereof by the user's scroll operation.

More specifically, the scroll information acquisition unit 102 sets the count of the number of times that the content image is displayed within the output area P206, to "1" at the start of the scroll. After that, if the content image is scrolled out of the output area P206 and enters the output area P206 again, then the scroll information acquisition unit 102 increments the number of times of display of content images by 1. As a result, the number of times of display of content image is "2" at this timing.

In the present exemplary embodiment, by repeating the above-described processing, the scroll information acquisition unit 102 acquires the information about the number of times of display of the content image. The scroll information acquisition unit 102 according to the present exemplary embodiment acquires the number of times of display of a content image whose number of times of display is the largest among the displayed content images.

More specifically, the scroll information acquisition unit 102 acquires the number of times of display of the content image that is scrolled earliest out of the output area P206, among all the content images displayed within the output area P206 at the start of the scroll display. Then, the scroll information acquisition unit 102 notifies the acquired number of times of display to the boundary determination unit 104.

The boundary determination unit 104 compares the number of times of display notified from the scroll information acquisition unit 102 with a boundary condition. More specifically, the boundary determination unit 104 compares a predetermined number of times with the number of times of display of the content image notified from the scroll information acquisition unit 102.

Further, the boundary determination unit 104 determines whether to change the group classification level of the content image to be displayed according to a result of the comparison. In the present exemplary embodiment, the "group classification level" refers to the range corresponding to each group used in classifying and grouping the contents.

More specifically, moving image contents that belong to a plurality of groups at the same time when grouped by a low group classification level (minor group) belongs to one specific group when grouped by a group classification level higher than the low group classification level (major group).

In other words, a plurality of moving image contents that have been grouped into one group (e.g., "sports") at a specific group classification level is classified and regrouped into a plurality of (smaller) groups (e.g., "baseball" and "football") when grouped in a lower group classification level.

In the present exemplary embodiment, when the group classification level is raised, a plurality of contents is grouped more roughly according to the attribute thereof. In the present exemplary embodiment, the lowest group classification level is a level in which contents are not classified yet, but individually displayed.

The group classification level will be described in detail below, as an example, by referring to a method for classifying and grouping a plurality of contents according to a category of broadcast program.

As described above, the attribute information 1 and 2 (FIG. 16A) is used in grouping the moving image contents according to the category of broadcast program. In the present exemplary embodiment, the attribute information 1 corresponds to a higher group classification level than the group classification level 2.

Furthermore, the lowest group classification level is a level in which a displayed content image corresponds to each moving image content item stored on the content storage unit 121. In other words, in the lowest group classification level, the moving image contents are not grouped, but displayed individually.

When the group classification level is raised from the lowest group classification level by one stage, the following group classification information is used to group the moving image contents. Namely, "domestic news broadcast program", "international news broadcast program", "weather forecast", "baseball", "football", "tennis", "triathlon", "quiz show", and "health information broadcast program" are used.

In the present exemplary embodiment, the "group classification information" refers to information used for classifying and grouping the moving image contents according to the attribute information included in a plurality of moving image contents. More specifically, if a content includes attribute information "baseball" as the attribute information for the group classification level (a group classification level 1) one stage higher than the lowest group classification level, then the content is classified into the group "baseball".

If a content includes group classification level 1 attribute information "inter-high school baseball games" or "2008 professional baseball", it is also useful if the content is classified into the group "baseball".

As described above, when at least a part of the content of the attribute information corresponding to the group classification level corresponds to the group classification information, if the contents are grouped so that the content is classified into the group to which the group classification information corresponds, then the contents can be classified and grouped according to the attribute information even if the user inputs an arbitrary attribute information.

If the group classification level is further raised by one stage in this state, then group classification information "news", "sports", and "variety show", for example, is used in classifying and grouping the plurality of moving image contents. In the present exemplary embodiment, the group classification information "news", "sports", and "variety show" is the group classification information corresponding to the highest group classification level.

More specifically, if a content having attribute information "baseball" for a group classification level includes another attribute information "sports" as a higher group classification level, then the content is classified into the group "sports".

In the present exemplary embodiment, the content classified into groups "domestic news program", "international news program", and "weather forecast" in the group classification level (the group classification level 1) one stage higher than the lowest group classification level is classified into the group "news" in the higher group classification level (a group classification level 2).

Furthermore, the content classified into groups "baseball", "football", "tennis", and "sumo wrestling" in the group classification level 1 is classified into the group "sports" in the group classification level 2.

In addition, the content classified into the groups "quiz show" and "health information broadcast program" in the group classification level 1 is classified into the group "variety show" in the group classification level 2. In the present exemplary embodiment, the group classification level 2 is the highest group classification level.

As described above, each moving image content that belongs to a plurality of groups when grouped by a low group classification level (e.g., "baseball", "football", "tennis", and "sumo wrestling") is classified into one group ("sports") when grouped by a group classification level higher than the low group classification level.

In the present exemplary embodiment, in the grouping method for grouping the contents according to the category of the broadcast program, the attribute information 2 corresponds to the group classification level 1 and the attribute information 1 corresponds to the group classification level 2.

The present exemplary embodiment classifies and groups a plurality of moving image contents according to the above-described group classification level. However, the hierarchical configuration of the group classification levels and the attribute information used for grouping the contents are not limited to those described above.

In the present exemplary embodiment, the boundary determination unit 104 previously holds the attribute information corresponding to each group classification level.

More specifically, each content is provided with the group classification level 1 attribute information in the category of broadcast program, such as "domestic news program", "international news program", "weather forecast", "baseball", "football", "tennis", "sumo wrestling", "quiz show", and "health information broadcast program". Furthermore, each content is provided with the group classification level 2 attribute information, such as "news", "sports", and "variety show".

More specifically, the group classification information to be displayed is determined according to the currently used group classification level. In other words, in the present exemplary embodiment, the boundary determination unit 104 determines the content grouping level according to the number of times of display of content image. The display control unit 105 displays the group classification information according to the group classification level determined by the boundary determination unit 104.

For example, in a first group classification level, the display control unit 105 displays the group classification information for the first group classification level. In a second group classification level, which is higher than the first group classification level, the display control unit 105 displays the group classification information for the second group classification level.

In the present exemplary embodiment, the boundary determination unit 104 changes the group classification information for grouping the contents (group classification level) according to a result of the comparison of the numbers of times of display of content image.

In the present exemplary embodiment, various grouping methods can be used instead of the category of broadcast program, the past broadcast date, and the past broadcast time.

Figure 10A:
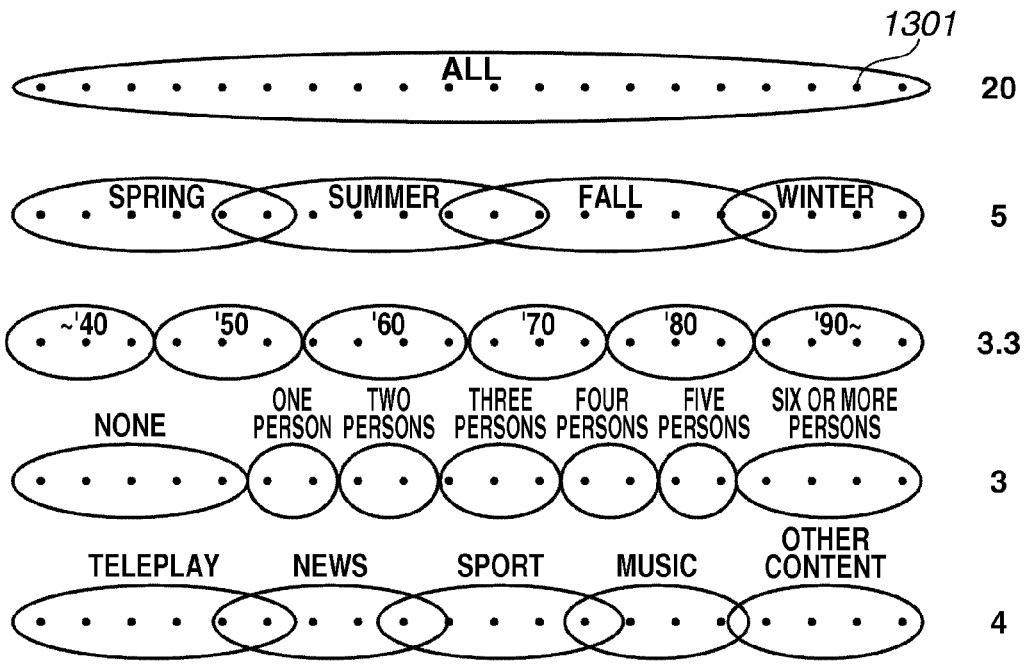
FIGS. 10A and 10B illustrates an example of a method for grouping contents according to an exemplary embodiment of the present invention.
Figure 10B:
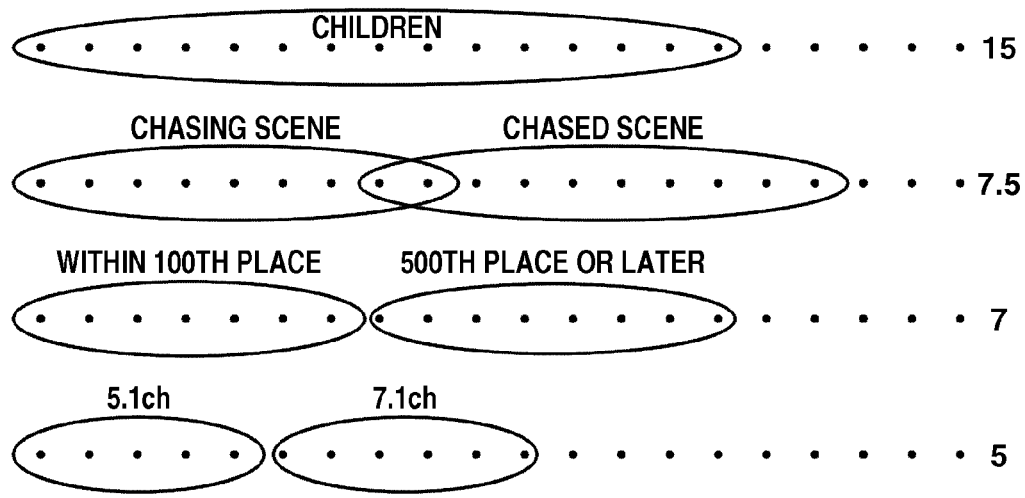

FIGS. 10A and 10B illustrate examples of the other grouping methods. FIG. 10A illustrates an example of another grouping method for grouping the moving image contents so that each moving image content belong to at least one of the groups.

Referring to FIG. 10A, each black dot 1301 indicates one moving image content. More specifically, in the example illustrated in FIG. 10A, twenty moving image contents, which are candidates of moving image content to be viewed, include six contents including attribute information "spring", eight content including attribute information "summer", eight content including attribute information "autumn", and five content including attribute information "winter".

Accordingly, in the present exemplary embodiment, all the contents can be grouped according to the season of shooting the moving image. If one moving image content includes attribute information for a plurality of seasons, then one content belongs to a plurality of groups.

More specifically, two of the six moving image contents including the attribute information "spring" also include attribute information "summer". Accordingly, the two moving image contents belong to two groups "spring" and "summer".

In the example illustrated in FIGS. 10A and 10B, the contents include attribute information for two successive seasons. However, the present exemplary embodiment is not limited to this.

As illustrated in FIG. 10A, it is useful to group the contents according to the grouping method that uses the shooting age, the number of persons included, or the category of broadcast program. In the present exemplary embodiment, the contents are grouped by a plurality of group classification levels according to the grouping method set by the user.

More specifically, as illustrated in FIG. 10A, in grouping the contents according to the shooting age, the time period from the year 1940 to the year 1990 is divided into six time periods (i.e., six decades are used in the grouping method). If the group classification level is further raised in this case, the time period from the year 1940 to the year 1990 is divided into three vicennial (twenty-year) time periods. When the group classification level is raised as described above, the contents are more roughly classified.

FIG. 10B illustrates an example of a grouping method for grouping the moving image contents so that at least one moving-image content item from among the candidates of moving image content items to be viewed, belongs to either one of the groups.

In the example illustrated in FIG. 10B, when the user selects, as the grouping method, the group of contents including the scenes in which children appear, fifteen items including scenes in which children appear are extracted from among twenty viewing content candidates of moving image content items.

In the example illustrated in FIG. 10B, the twenty moving image contents, which are candidates of the moving image content to be viewed, are grouped according to whether the contents include a "chasing" scene. As a result of the grouping, nine contents including a "chasing" scene and ten contents including a "chased" scene have been extracted and classified into each corresponding group.

As described above, if the user desires to extract the contents that satisfy a specific condition only, it is also useful if the contents not related to the condition are not grouped.

In the examples illustrated in FIGS. 10A and 10B, each of numerals provided to the right side of the groups indicates an average value of the number of moving image contents included in each group. More specifically, if twenty moving image contents are grouped according to four kinds of group classification information, namely, "spring", "summer", "autumn", and "winter," if it is not considered that one moving image content may belong to a plurality of groups at the same time, then the average value of the number of the moving image contents that belong to one group is five.

The image generation unit 103 groups a plurality of moving image contents stored on the content storage unit 121 according to the group classification information. Furthermore, the image generation unit 103 generates an image indicating group classification information (a group classification information image).

In the present exemplary embodiment, the image generation unit 103 generates a still image indicating group classification information corresponding to a plurality of contents. However, the present exemplary embodiment is not limited to this. More specifically, it is also useful if the moving image generates a moving image indicating group classification information corresponding to a plurality of contents.

In addition, it is also useful if the image generation unit 103 previously generates group classification information image. Furthermore, it is also useful if the image generation unit 103 generates a group classification information image if it is determined by the boundary determination unit 104 that group classification information image is to be displayed.

If it is determined by the boundary determination unit 104 that the number of times of display of the content image has reached a predetermined value, then the image generation unit 103 outputs data of the generated group classification information image to the display control unit 105.

The display control unit 105 displays the reduced number of moving images corresponding to the moving image contents stored on the content storage unit 121 and thumbnail images of the reduced moving images on the display unit 122 as content images.

When the user performs a scroll operation via the operation unit 120, the display control unit 105 scroll-displays a plurality of contents. More specifically, the display control unit 105 scroll-displays a plurality of contents (a plurality of content images).

Further, the display control unit 105 reads moving image contents from the content storage unit 121 according to information for designating a content image, which is received via the operation unit 120. The display control unit 105 displays the read moving-image content items on the display unit 122. In other words, the display control unit 105 serially displays contents included in the "sports" group, those included in the "variety show" group, and those included in the "news" group.

In addition, after receiving the data of the group classification information image, which has been output from the image generation unit 103 according to the number of times of display of content image, the display control unit 105 displays the received group classification information image on the display unit 122.

More specifically, when the number of times of display of the scroll-displayed content (content images) reaches a predetermined number, the display control unit 105 determines whether to display the group classification information (group classification information images) so that the group classification information corresponding to a plurality of contents is displayed.

Now, an exemplary flow of processing executed by the display control apparatus 100 according to the present exemplary embodiment will be described in detail below with reference to FIG. 11.

Figure 11:
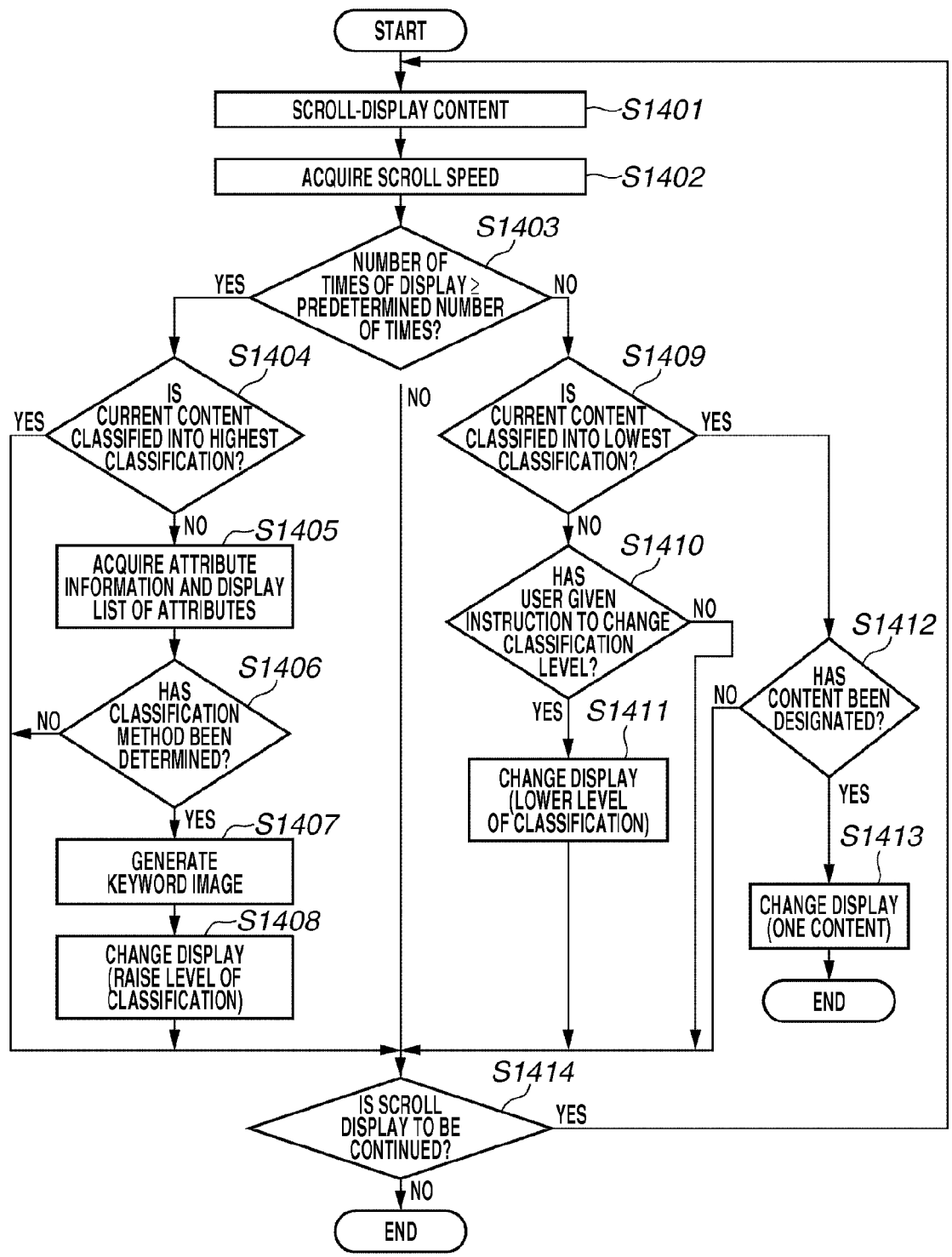
FIG. 11 is a flow chart illustrating an example of processing according to an exemplary embodiment of the present invention.

FIG. 11 is a flow chart illustrating exemplary flow of display control processing executed by the display control apparatus 100 according to the present exemplary embodiment. In the present exemplary embodiment, the display control apparatus 100 executes the processing of each component illustrated in FIG. 1 by using dedicated the hardware. However, it is also useful if the processing is executed by software. More specifically, it is also useful if the processing according to the present exemplary embodiment is executed by a CPU that controls the operation of the components of the display control apparatus 100 by loading and executing a program from the ROM and so on.

When the user performs a scroll operation of the displayed contents, the processing illustrated in FIG. 11 starts.

Referring to FIG. 11, in step S1401 (scroll processing), the display control unit 105 scroll-displays content images corresponding to a plurality of contents on the display screen of the display unit 122. In the present exemplary embodiment, before the scroll display is started, a plurality of content images is displayed in a stationary state. However, it is also useful if the scroll display of the plurality of content images is started when the display unit 122 is activated.

The content images are displayed as reduced moving images within the output area P206 (FIG. 9A) while they are displayed as still images outside thereof. The content image corresponds to a moving image content stored on the content storage unit 121 in a one to one relation. In the present exemplary embodiment, the user can reproduce a content to be viewed by selecting a content image displayed as a reduced moving image. Furthermore, the display control unit 105 scroll-displays the content images at the scroll speed changed and designated by the user's scroll operation via the operation unit 120. The display control unit 105 continues the scroll display of the content images or the group classification information images while executing the processing illustrated in FIG. 9.

In step S1402, the scroll information acquisition unit 102 acquires information about the number of times of display of the content image from the display control unit 105. As described above, in the present exemplary embodiment, the "number of times of display of content image" is equivalent to the number of times a content image enters the output area P206 from outside thereof.

The scroll information acquisition unit 102 acquires the number of times of display of content image whose number of times of display is the largest of those of displayed content images. In the present exemplary embodiment, as described above, the scroll information acquisition unit 102 acquires the number of times of display of the content from the display control unit 105. However, it is also useful if the number of times of display of content image is calculated based on the scroll speed designated via the operation unit 120 and the length of time of the scroll display.

After receiving the information about the number of times of display of content image from the display control unit 105 in step S1402, the scroll information acquisition unit 102 notifies the received information about the number of times of display of content image to the boundary determination unit 104. Then, the processing advances to step S1403.

In step S1403, the boundary determination unit 104 determines whether the number of times of display of content image that is notified from the scroll information acquisition unit 102 in step S1402 has reached a predetermined number of times.

If it is determined that the number of times of display of content image has reached the predetermined number of times (Yes in step S1403), then the processing advances to step S1404. On the other hand, if the number of times of display of content image has not reached the predetermined number of times (No in step S1403), then the processing advances to step S1409.

In step S1404, the boundary determination unit 104 determines whether the current group classification level is the highest group classification level. In other words, the display control apparatus 100 determines whether the group classification level can be further raised (i.e. the content items further grouped into larger, more general groups with larger numbers of content items).

If it is determined that the current group classification level is the highest group classification level (Yes in step S1404), then the processing advances to step S1414. On the other hand, if it is determined that the current group classification level is not the highest group classification level (No in step S1404), then the processing advances to step S1405.

In step S1414, the display control unit 105 determines whether the user has given an instruction for discontinuing the scroll display via the operation unit 120. If it is determined that the user has given an instruction for discontinuing the scroll display by an instruction for discontinuing the scroll or by powering off the display unit 122 (No to the question of whether the scroll display is to be continued in step S1414), then the processing ends. On the other hand, if it is determined that the scroll display is not to be discontinued (Yes in step S1414), then the processing returns to step S1401.

More specifically, if it is determined that the current group classification level is the highest group classification level (Yes in step S1404), then the display control unit 105 determines that the group classification level cannot be raised from the current level and executes control to continue or discontinue the scroll display.

In step S1405, the attribute acquisition unit 101 acquires the attribute information of the moving image contents stored on the content storage unit 121. The attribute information includes the attribute information related to the category of broadcast program (e.g., "sports", "baseball", or "inter-high school baseball games") and the attribute information related to the broadcast time (e.g., "broadcast date and time", "broadcast start time", and "broadcast time length".

As described above, attribute information related to a plurality of broadcast program categories or attribute information related to a plurality of types of broadcast time may belong to one content.

Furthermore, in step S1405, if a plurality of kinds of attribute information, such as the attribute information related to the category of broadcast program corresponding to group classification levels exists, then the attribute acquisition unit 101 acquires the attribute information according to the current group classification level.

In the present exemplary embodiment, an initial group classification level is the lowest group classification level. In the lowest group classification level, the display control unit 105 displays content images individually.

For example, attribute information, such as "inter-high school baseball games" or "professional baseball games" is acquired by the attribute acquisition unit 101 in step S1405 in a specific group classification level. In this case, at the current group classification level higher than the specific group classification, the attribute acquisition unit 101 acquires the attribute information "baseball". The attribute acquisition unit 101 notifies the acquired attribute information to the image generation unit 103.

Further, in step S1405, the image generation unit 103 generates a plurality of images indicating the attribute information, which are candidates of the method for grouping a plurality of contents according to the attribute information notified from the attribute acquisition unit 101. The image generation unit 103 outputs data of the generated images to the display control unit 105.

The display control unit 105 displays the images input by the image generation unit 103, which are candidates of the method for grouping the plurality of contents on the display unit 122. Then, the processing advances to step S1406.

More specifically, the display control unit 105 controls the display of the group classification information so that the group classification information (images indicating candidates of the grouping method) for selecting the method of grouping a plurality of contents is displayed when the time length of scroll display reaches a predetermined value. In the present exemplary embodiment, the "time length of scroll display" refers to the length of time of continuously executed scroll display.

Figure 13:
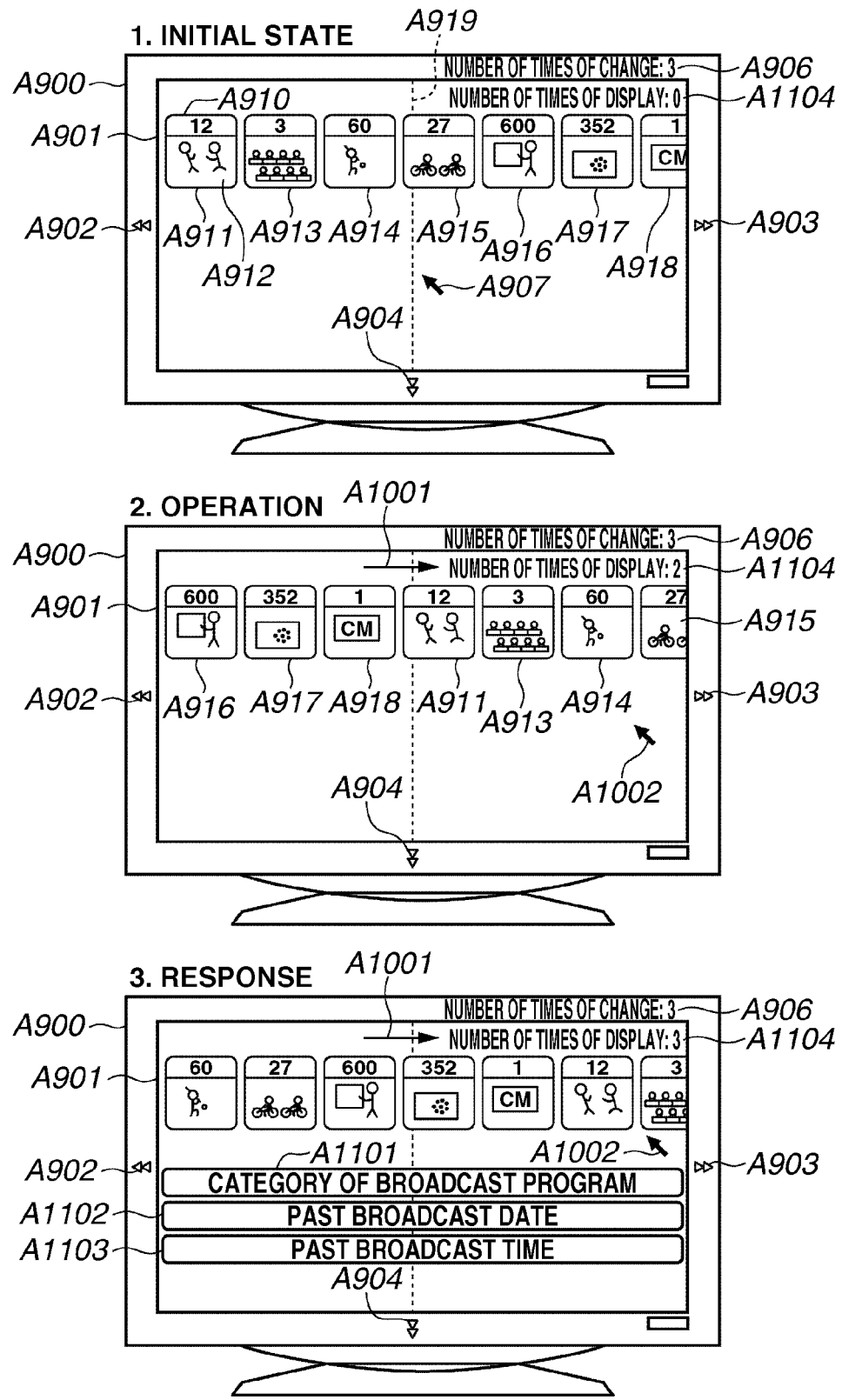
FIG. 13 illustrates an example of a display screen according to an exemplary embodiment of the present invention.

FIG. 13 illustrates an example of an image indicating candidates of the method for grouping a plurality of contents. Referring to FIG. 13, images A1101 through 1103 displayed on a display screen "3. response" are grouping method candidate images. The user can group the contents according to the category of broadcast program (e.g., "sports" or "variety show"), the broadcast date and time, or the broadcast time by selecting the grouping method candidate A1101, A1102, or A1103, respectively.

The display format of the content images A911 and A913 through A918, which are displayed on the display screen illustrated in FIG. 13, is different from the display format of the content images A through G illustrated in FIGS. 9A to 9C. However, either of the content image display formats (or others not disclosed) can be used in the present invention.

More specifically, the grouping method candidates A1101 through A1103 can be displayed in the display format illustrated in FIG. 9 similar to the display screen "3. response" in FIG. 13.

Figure 15:
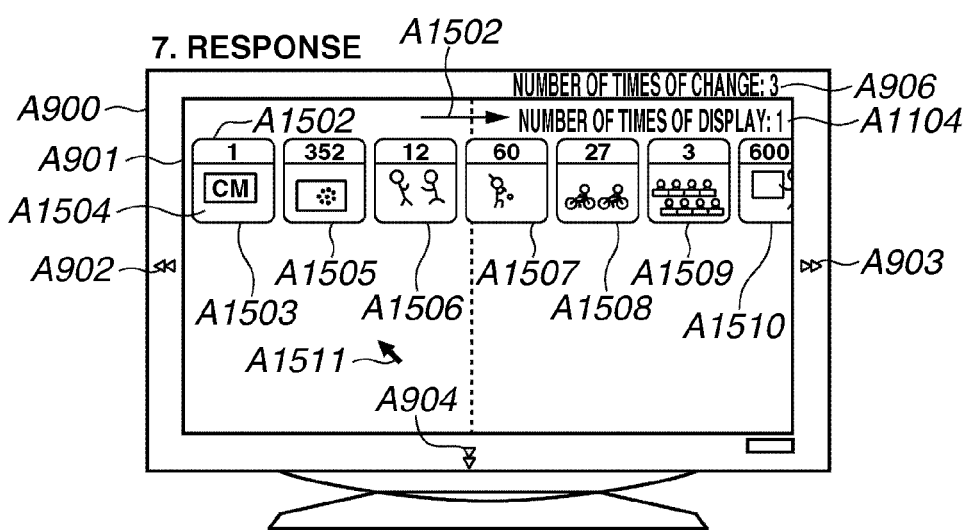
FIG. 15 illustrates an example of a display screen according to an exemplary embodiment of the present invention.

In display formats illustrated in FIGS. 13 through 15, a fixed display area illustrated in FIG. 9 is not provided. In the examples illustrated in FIGS. 13 through 15, only the images included in the fixed display area illustrated in FIG. 9 can be displayed. In this case, all of the seven content images displayed on a display screen A900 (FIGS. 13 through 15) are displayed as reduced moving images. However, the present exemplary embodiment is not limited to this. Nevertheless, the display screen A900 can include a fixed display area.

On the display screen "3. response" illustrated in FIG. 13, the grouping method candidate A1101 displays a text string "category of broadcast program". In addition, the grouping method candidate A1102 displays a text string "past broadcast date and time". The grouping method candidate A1103 displays a text string "past broadcast time".

As described above, the display control apparatus 100 determines candidates of content grouping method according to the attribute information of each content acquired in step S1405 and displays images of the grouping method candidates. However, the present exemplary embodiment is not limited to this. More specifically, it is also useful if the image generation unit 103 previously generates images which indicate a content grouping method.

In step S1406, the image generation unit 103 determines whether the grouping method has been determined. More specifically, if one image, from among a plurality of images indicating methods for grouping the contents displayed in step S1405, is selected by the user, the image generation unit 103 determines that the method for grouping a plurality of contents has been determined.

As described above, the content grouping methods include a method for grouping the contents according to the category of broadcast program (corresponding to the grouping method candidate A1101), the broadcast date and time (corresponding to the grouping method candidate A1102), and the broadcast start time (corresponding to the grouping method candidate A1103). However, the present exemplary embodiment is not limited to this.

If it is determined that the content grouping method has been determined (Yes in step S1406), then the processing advances to step S1407. On the other hand, if it is determined that no content grouping method has been determined, then the processing advances to step S1414.

In step S1407, the image generation unit 103 generates a group classification information image to be displayed on the display unit 122 according to the content grouping method determined in step S1406.

Furthermore, the image generation unit 103 outputs the generated group classification information image to the display control unit 105. Then, the processing advances to step S1408. In the present exemplary embodiment, a "group classification information image" refers to an image generated to visually and clearly notify the group classification information described above to the user.

If the user has selected the category of broadcast program as the content grouping method, then the image generation unit 103 generates a group classification information image (text string), such as "baseball", "quiz show", "weather forecast", or "domestic news".

In step S1408, the display control unit 105 displays the group classification information image received from the image generation unit 103 on the display screen of the display unit 122. More specifically, if the content images are displayed on the display unit 122 and it is determined that the number of times that content image is displayed has reached the predetermined number of times in step S1403, and if it is determined that the content grouping method has been determined, then the display control unit 105 displays the group classification information images corresponding to a plurality of contents instead of displaying the content images.

FIG. 14 illustrates an example of a group classification information image displayed by executing the processing in step S1408 (group classification information display control processing). Referring to FIG. 14, images A1301, A1304, and A1305 displayed on a display screen "5. response" are group classification information images displayed after executing the processing in step S1408. More specifically, the group classification information images A1301, A1304, and A1305, which are group classification information for classifying and grouping a plurality of contents, are displayed when the number of times that scroll-displayed contents is displayed reaches a predetermined number of times.

In the example illustrated in FIG. 14, the user has selected the grouping method candidate A1101 via the display screen "4. operation". Then, in step S1406, the user has determined that the contents are to be grouped according to the category of broadcast program. Accordingly, the display control unit 105 displays the group classification information related to the category of broadcast program.

In the present exemplary embodiment, the group classification information image is a still image. However, the present exemplary embodiment is not limited to this. More specifically, it is also useful if a moving image or an image including audio data is used as the group classification information image.

In addition, in the present exemplary embodiment, the group classification information image indicates the group classification information using a text string. However, the present exemplary embodiment is not limited to this. More specifically, it is also useful if the group classification information is indicated using an illustration together with a text string.

If the group classification information images are already displayed, in step S1402, the boundary determination unit 104 acquires the number of times that group classification information image is displayed. In this case, if it is determined that the number of times that group classification information image is displayed has reached a predetermined number of times (Yes in step S1403), then the display control unit 105 displays the group classification information images corresponding to a group classification level higher than the current group classification level.

More specifically, when the group classification level is changed, the number of times of display is reset. In this case, the number of times of display is counted per group classification level. In this case, the processing in steps S1405 and 1406 can be omitted.

Now, the group classification level and the group classification information corresponding thereto will be described in detail below.

Suppose that group classification information images, such as "domestic news broadcast program", "international news broadcast program", "weather forecast", "baseball", "football", "tennis", "sumo wrestling", "quiz show", and "health information broadcast program" are displayed according to the current group classification level (the group classification level 1).

In this case, if the group classification level is further raised (to the group classification level 2), then the group classification information "news", "sports", and "variety show" is displayed.

As described above, when the group classification level is raised, the number of kinds of displayed group classification information becomes smaller.

More specifically, if the number of times that the content (content image) is displayed reaches a first predetermined number of times, then the display control unit 105 displays first group classification information of a plurality of contents (group classification information images of the group classification level 1).

If the number of times that the first group classification information is displayed reaches the second predetermined number of times while the user performs scroll operation, then the display control unit 105 displays second group classification information (group classification information images of the group classification level 2), whose number of kinds is smaller than that of the first group classification information.

As described above, in the present exemplary embodiment, the display control apparatus 100 raises the group classification level if the number of times that the content image or the group classification information image is displayed reaches a predetermined number of times for the following reasons.

If the number of times of display is large but the content to be viewed has not yet been selected by the user, it is highly likely that the user has not decided a content to view yet. Accordingly, in the present exemplary embodiment, the display control apparatus 100 classifies and groups moving image contents according to the number of times that the content image or group classification information image is displayed. Thus, the user can easily select a content to view.

After the display control unit 105 has raised the group classification level, the processing advances to step S1414. The processing for raising the group classification level includes processing for changing the display from the display of content images to the display of group classification information images.

On the other hand, if it is determined that the number of times that the content image is displayed, is smaller than the predetermined number of times (No in step S1403), then the processing advances to step S1409. In step S1409, the boundary determination unit 104 determines whether the current group classification level is the lowest group classification level.

If a currently displayed content image and the content stored on the content storage unit 121 correspond to each other in a one to one relation (i.e. the currently displayed content image is an individual content item such as a broadcast programme), then the boundary determination unit 104 determines in step S1409 that the current group classification level is the lowest group classification level (YES), as described above.

In other words, if, instead of the group classification information images, the content images themselves are displayed, the boundary determination unit 104 determines that the current group classification level is the lowest group classification level.

If it is determined that the current group classification level is not the lowest group classification level (No in step S1409), then the processing advances to step S1410. On the other hand, if it is determined that the current group classification level is the lowest group classification level (Yes in step S1409), then the processing advances to step S1412.

In step S1410, the boundary determination unit 104 determines whether the user has given an instruction for changing the group classification level by using pointing device such as a mouse. More specifically, the boundary determination unit 104 determines whether the user has given an instruction for lowering the group classification level via the operation unit 120.

If it is determined that the user has given an instruction for lowering the group classification level (Yes in step S1410), then the processing advances to step S1411. On the other hand, if it is determined that the user has not given an instruction for lowering the group classification level (No in step S1410), then the processing advances to step S1414.

In step S1411, the display control unit 105 lowers the group classification level from the current group classification level. In other words, if the group classification information images of the highest group classification level are currently displayed, then the display control unit 105 executes the processing in step S1411 to display the group classification information images corresponding to the group classification level one stage lower than the highest group classification level.

On the other hand, if the group classification information images corresponding to the group classification level one stage higher than the lowest group classification level (i.e., the group classification level 1) is displayed, then the display control unit 105 executes the processing in step S1411 to change the display from the display of the group classification information images to the display of the content images.

After the group classification level is lowered by the display control unit 105, the processing advances to the step S1414.

In lowering the group classification level in step S1411, the display control unit 105 sorts the content images or the group classification information images to be displayed after the processing in step S1411 according to the group classification information that has been used in a previous operation for grouping the contents.

More specifically, in changing the display from the display of the group classification information images to the display of the content images by executing the processing in step S1411, the plurality of content images are displayed in the order by which the content images of the moving image contents corresponding to the same group classification information are arranged adjacent to one another. In other words, the content images are sorted and displayed according to the group classification information corresponding to the highest (narrowest) group classification level.

More specifically, if the group classification information (group classification information images) of the group classification level 1, which is one stage higher than the lowest group classification level, is currently displayed and if the user has given an instruction for lowering the group classification level in this state, then the display control unit 105 changes the display from the display of the group classification information images to the display of the content images in the order according to the group classification information.

Now, the method for sorting the content images, which is executed when the group classification level is lowered, will be described in detail below.

Suppose that the order of display of the content images to be displayed is the order stored on the content storage unit 121 at the start of the scroll display. In this case, the content images to be displayed are not sorted according to the category of broadcast program at the start of the scroll display.

On the other hand, suppose that the user has selected the category of broadcast program as the content grouping method when the number of times of display of content image has reached the predetermined number of times. In this case, the group classification information images such as "domestic news broadcast program", "international news broadcast program", "weather forecast", "baseball", "football", "tennis", "sumo wrestling", "quiz show", and "health information broadcast program" are displayed on the display screen.

In this case, if the group classification level is lowered by the processing in step S1411 and thus the content images are displayed, then the content images to be displayed is sorted so that the content images are to be displayed in the order according to the category of broadcast program.

In the display screen "5. response" illustrated in FIG. 14, as a result of the above-described sorting, the contents that belong to the category of "baseball" (corresponding to "channel 12" and "channel 60") have been grouped into the group "baseball". Similarly, the contents that belong to the category of "quiz show" (corresponding to "channel 3" and "channel 600") have been grouped into the group "quiz show".

FIGS. 16A and 16B illustrate an example of the order of displaying moving image contents corresponding to the content images before and after the above-described sorting, respectively. FIG. 16A illustrates an example of the attribute information of the moving image contents before the above-described sorting and an example of the order of displaying the content images corresponding to the moving image contents.

In the example illustrated in FIG. 16A, the content images to be displayed are not sorted according to the attribute information.

FIG. 16B illustrates an example of the order of displaying the content images according to the category of broadcast program after the above-described sorting. In the example illustrated in FIG. 16B, the content images to be displayed are sorted according to the category of broadcast program.

With the above-described configuration, the present exemplary embodiment can enable the user to easily select a content to view.

On the other hand, if it is determined that the current group classification level is the lowest group classification level (Yes in step S1410), then the processing advances to step S1412. In step S1412, the display control unit 105 determines whether the user has designated the moving image content to view via the operation unit 120.

If it is determined that the user has designated the moving image content to view (Yes in step S1412), then the processing advances to step S1413. On the other hand, if it is determined that the user has not designated a moving image content to view (No in step S1412), then the processing advances to step S1414.

In step S1413, the display control unit 105 reads the data of the designated moving image contents from the content storage unit 121. In addition, the display control unit 105 displays the read data of the designated moving image contents on the display unit 122. Then, the scroll display processing ends.

More specifically, if it is determined that the current group classification level is the lowest group classification level in step S1409, the group classification level cannot be further lowered. Accordingly, the processing advances to processing for determining whether the user has selected the content to view.

In the present exemplary embodiment, the user can designate a content to view when content images are displayed (when the group classification level is the lowest group classification level).

However, the present exemplary embodiment is not limited to this. More specifically, it is also useful if the user designates the displayed group classification information image by operating the operation unit 120 to display the group classification information image corresponding to the group classification level one stage lower than the group classification level of the group classification information.

In addition, it is also useful if the user can designate and display a content image corresponding to the group classification information designated by the user via the operation unit 120. Thus, the user can designate the content to be viewed from among the content images.

In other words, it is also useful if the user inputs an instruction for displaying the contents (content images) corresponding to the displayed group classification information (group classification information images).

With the above-described configuration, the present exemplary embodiment can enable the user to exclude from the screen the display of the content images or the group classification information images corresponding to the moving image contents that the user does not desire to view. Accordingly, the user can effectively select a content to view.

Now, an example of the user operation via the operation unit 120 and changes of the screen displayed on the display unit 122 will be described in detail below with reference to FIGS. 9 and 12 through 15.

Figure 12:
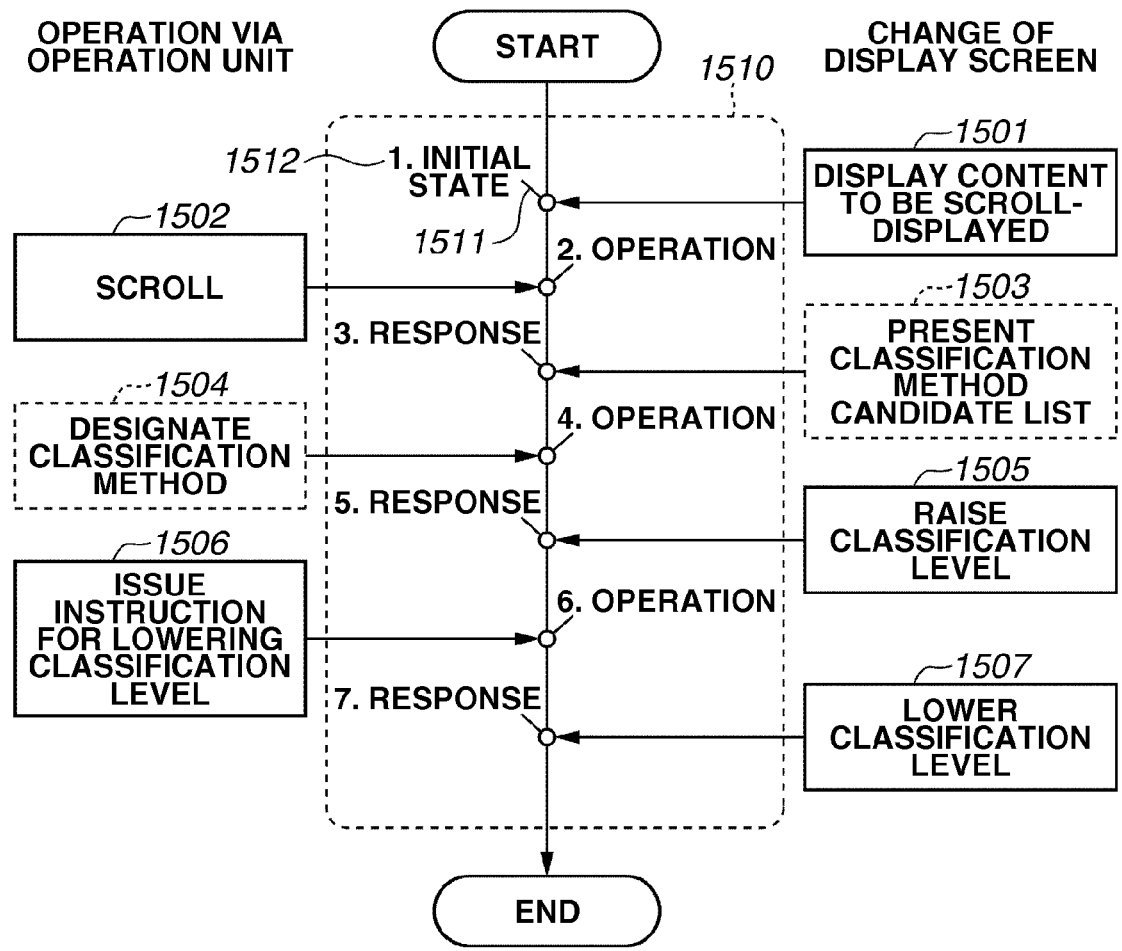
FIG. 12 illustrates an example of processing according to an exemplary embodiment of the present invention.

FIG. 12 illustrates an example of a user (content viewing user) operation and the change of the screen displayed on the display unit 122 executed according to the user operation.

Referring to FIG. 12, each operation illustrated in FIG. 12 within a dotted-line edge-rounded rectangle corresponds to each of display screens illustrated in FIGS. 13 through 15.

More specifically, the screen displayed during the operation "1. initial state" illustrated in FIG. 12 corresponds to the display screen "1. initial state" illustrated in FIG. 13. Similarly, the screen displayed during the operation "2. operation" illustrated in FIG. 12 corresponds to the display screen "2. operation" illustrated in FIG. 13. In the similar manner, each of operations "3. response" through to "7. response" illustrated in FIG. 12 corresponds to the display screen illustrated in FIGS. 13 through 15. A display unit A900 illustrated in FIGS. 13 through 15 corresponds to the display unit 122 illustrated in FIG. 1.

The content images may be displayed on the display unit 122 either in the display formats illustrated in FIGS. 13 through 15 or in the format illustrated in FIG. 9.

In the present exemplary embodiment, when the user executes the scroll operation of the contents to view, the processing illustrated in FIG. 12 starts. In the example illustrated in FIG. 12, in the operation "1. initial state" (processing 1501), the display control unit 105 displays content images.

More specifically, the display control unit 105 displays each content image corresponding to the moving image content stored on the content storage unit 121 in a one to one relation at the start of the processing At this time, the display screen "1. initial state" illustrated in FIG. 13 is displayed on the display screen A900.

In the example illustrated in FIG. 13, each of content images A911 and A913 through A918 are displayed on the display screen A900. In the present exemplary embodiment, a "content image" refers to a reduced moving image of a plurality of moving image contents or a still image.

As described above, in the display format illustrated in FIG. 9, the content images displayed within the output area P206 are displayed as reduced moving images while those displayed outside the output area P206 are displayed as still images. However, in the display format illustrated in FIG. 13, it is also useful if all of the content images displayed on the screen are regarded as existing within a fixed display area.

In other words, in the display format illustrated in FIG. 13, if a content image goes out of the screen from the right edge thereof by a rightward scroll operation by the user, then the content image is not displayed for a specific period of time. If a predetermined length of time passes after that, the content image enters the screen to be displayed again. Namely, the output area P206 illustrated in FIG. 9 corresponds to the display screen illustrated in FIG. 13.

In the above-described display format, the scroll information acquisition unit 102 acquires the number of times that the content image is displayed on the display screen A900, as information about the number of times that the content image is displayed.

In the present exemplary embodiment, the number of content images that can be simultaneously displayed on the display screen and the number of the content images to be actually displayed coincide with each other. Accordingly, all the content images are displayed on the screen.

In other words, a content image that may otherwise go out of the screen from the right edge of the screen by a rightward scroll operation by the user enters the screen again from the left edge of the screen immediately after going across the right edge thereof and is continuously displayed on the screen.

In this case also, the scroll information acquisition unit 102 acquires information about the number of times that the content image is displayed based on the number of times that the content image moves from the right edge to the left edge of the screen.

In the example illustrated in FIG. 13, a left arrow A902 has a function of applying a leftward positive acceleration to the scroll speed when the user moves the mouse pointer A907 leftward across a vertical centre line A919 on the display screen A900. Further, a right arrow A903 has a function of applying a rightward positive acceleration to the scroll speed when the user moves the mouse pointer A907 rightward across the vertical center line A919 on the display screen A900.

Furthermore, a down arrow 904 has a function of lowering the group classification level, which is executed when the user presses thereon (clicks the down arrow A904 with the mouse pointer 404). For example, if the current group classification level is the group classification level 1 (the group classification level one stage higher than the lowest group classification level) and the user presses the down arrow A904, the user can change the display from the display of the group classification information images to the display of the content images.

Furthermore, as indicated by the content image A911 in FIG. 13, a channel number of moving image content is provided on a content image in an upper portion thereof. In the present exemplary embodiment, a "channel number" refers to a number for identifying a provider of the moving image content. Furthermore, a reduced moving image A912 of the moving image contents is provided below the channel number. As described above, each content image includes a channel number and a reduced image of moving image content.

At the start of the scroll display, with respect to the order of display of content images, the content images are arranged in the order stored on the content storage unit 121. However, the configuration of the content images is not limited to this. More specifically, it is also useful if the order of channel numbers is used as the order of displaying the content images.

The moving image content corresponding to the content image A911 illustrated in FIG. 13 includes attribute information, such as "sports", "baseball", "Mar. 3, 2006", and "12:00-15:00", as illustrated in FIG. 16A as contents of the channel number "12". The attribute information "sports" and "baseball" is used to classify and group the contents according to the category of broadcast program. The attribute information "sports" is attribute information in the group classification level one stage higher than "baseball".

The attribute information "Mar. 3, 2006" is attribute information that indicates the past broadcast date of the moving image content corresponding to the content image A911. The attribute information "12:00-15:00" is attribute information that indicates the past broadcast time of the moving image content.

Each of the attribute information described above is used to classify and group the contents according to the past broadcast date and the past broadcast time. A channel number can also be used as the attribute information for classifying and grouping the contents. In other words, the moving image content corresponding to each content image displayed on the display screen illustrated in FIG. 13 includes the attribute information illustrated in FIG. 16A.

When the user executes a scroll operation via the operation unit 120 on the display screen "1. start" illustrated in FIG. 13 (corresponding to processing 1502 illustrated in FIG. 12), the display control unit 105 executes control to scroll-display the content images.

While the above-described content image scroll-display operation is executed, the display screen "2. operation" illustrated in FIG. 13 is displayed. In the present exemplary embodiment, the length and direction of an arrow A1101, which is provided in an upper portion of the display screen A900, correspond to the level of scroll speed and the scroll direction. The fixed arrow A1101 is displayed in a centre in the upper portion of the display screen regardless of the content image scroll display operation.

Further, in the present exemplary embodiment, as displayed on the display screen "2. operation" illustrated in FIG. 13, the number of times of display A1104 and the number of times A906 that display is changed, are displayed on the display unit 122.

The number of times of display A1104 is equivalent to the number of times that the content image is displayed, which is acquired by the scroll information acquisition unit 102. As described above, the number of times of display A1104 is equivalent to the number of times a content image enters the display screen (output area) A900 from outside thereof by the user's scroll operation.

In the example illustrated in FIG. 13, the number of times of display A1104 is displayed as "2" on the display screen "2. operation". The number of times of display A1104 has the value "2" when, for example, in FIG. 13, the content image that has been displayed within the display screen A900 at the start of the scroll, once scrolls out of the display screen A900 and then enters therein again.

On the other hand, the number of times that display A906 is changed indicates the number of times that the content image is displayed before the group classification level is raised. If a value "3" is set as the value of the number of times that the display A906 is changed and if the number of times that the content image is displayed reaches three, then the display control unit 105 executes processing for raising the group classification level. In other words, the number of times that the display A906 is changed is used as the information about the predetermined number of times, which is used in the determination in step S1403.

In the display screen "initial state" illustrated in FIG. 13, in which the scroll display has not been started yet, the number of times that the content image A1104 is displayed, is "zero" because the counting of the number of times that the content image is displayed has not been started yet. If the scroll display starts, the value "1" is set to the number of times that the content image is displayed. However, the present exemplary embodiment is not limited to this. More specifically, it is also useful if the display at the start of the scroll display is not counted.

If it is determined that the number of times that the content image is displayed has reached the predetermined number of times of display when the user continues the scroll display, then the display control unit 105 displays the grouping method candidate list (processing 1503).

More specifically, as illustrated in the example in FIG. 13, the display screen "3. response" is displayed in this case, which includes the grouping method candidates 1101 through 1103 ("category of broadcast program", "past broadcast date", and "past broadcast time").

In processing 1504 (FIG. 13), the user can use a mouse to select one from the list of grouping method candidates, which is displayed as described above. Thus, the user selects and designates the method for grouping the plurality of contents.

In the present exemplary embodiment, it is supposed, as illustrated in the display screen "4. operation" illustrated in FIG. 14, that the user has selected the grouping method "category of broadcast program" from among the grouping methods included in the displayed grouping method list by using a mouse pointer 1201.

As described above, in the present exemplary embodiment, when the number of times that the content image is displayed reaches the predetermined number of times, the user can change and select the method for grouping the plurality of contents. By displaying the grouping method list as described above, the present exemplary embodiment can allow the user to select the grouping method as desired according to the number of times that the content image is displayed. However, the present exemplary embodiment is not limited to this.

It is also useful if a previously set grouping method is used or if a grouping method that was used in past operations is used.

After the grouping method has been selected in the processing 1504 in FIG. 12, the display control unit 105 changes the group classification level in processing 1505. More specifically, the display control unit 105 changes the display from the display of content images to the display of group classification information images, as illustrated in the display screen "5. response" (FIG. 14).

As illustrated in FIG. 14, when the user selects the grouping method "category of broadcast program" as the method for grouping the plurality of contents, the display control unit 105 groups the plurality of contents by using the attribute information 2 (FIG. 16) and displays the group classification information image corresponding to the grouped contents.

The attribute information 2 is used to group the contents according to the category of broadcast program as described above. The attribute information 1 is used to group the contents according to the category of broadcast program and it is the information corresponding to the group classification level one stage higher than the group classification level to which the attribute information 2 corresponds. Accordingly, the display control unit 105 groups the plurality of contents according to the attribute information 2. By using the attribute information 2, the contents are grouped further specifically than in the grouping carried out with the attribute information 1.

If the user further scrolls the displayed contents and the number of times that the group classification information image is displayed reaches a predetermined number of times, then the display control unit 105 classifies and groups the contents by using the attribute information 1. However, the description thereof is omitted here.

In the example illustrated in FIG. 14, the group classification information images correspond to the groups "baseball", "quiz show", and "weather forecast" in the display screen "5. response". If the user scrolls the display screen, the other group classification information images corresponding to groups "triathlon" and "domestic news" are appropriately displayed.

When the group classification level is raised in the processing 1505 illustrated in FIG. 12, the screen "6. operation" illustrated in FIG. 14 is displayed on the display screen A900. In the example illustrated in FIG. 14, a value "1" is set as the number of times that the content image A1104 is displayed because the number of times that the group classification information image is displayed has been reset due to the rise in the group classification level. Furthermore, a value "5" is set as the number of times of change of display A906. On the other hand, in the display screen "1. initial state" illustrated in FIG. 13, the value "3" is set as the number of times that display A906 is changed.

As described above, the number of times that display A906 is changed is used as the predetermined number of times, which is used in the comparison between the number of times that the content image is displayed and the number of times that the display is changed in step S1403 (FIG. 9).

The present exemplary embodiment changes the number of times that display is changed according to the group classification level for the following reasons.

When the group classification level is raised, the number of displayed images becomes smaller. Accordingly, when the images are scroll-displayed at a constant scroll speed for a specific length of time, the number of times of display becomes larger as the group classification level becomes higher.

Therefore, the present exemplary embodiment increases the number of times that the content image is displayed before changing the group classification level, when the group classification level is raised. With the above-described configuration, the present exemplary embodiment can prevent a frequent change of the group classification level. On the other hand, if the group classification level is lowered, the present exemplary embodiment reduces the number of times that the content image is displayed before the group classification level is changed. However, the present exemplary embodiment is not limited to this. It is also useful if a fixed value is set as the number of times that the display is changed regardless of the group classification level.

In the present exemplary embodiment, when the user selects a grouping method, the grouping method candidate list is not displayed. Accordingly, the present exemplary embodiment can simplify the display screen. In addition, the present exemplary embodiment having the above-described configuration can prevent the user from newly selecting a grouping method by mistake.

However, the present exemplary embodiment is not limited to this. It is also useful if the grouping method candidate list is displayed while the group classification information images are displayed so that the user can change the content grouping method.

With the above-described configuration, the present exemplary embodiment can allow the user to set a desired grouping method if he has selected a wrong grouping method.

After having changed the group classification level in the processing 1505 (FIG. 12) and if the user gives an instruction for lowering the group classification level via the operation unit 120 (processing 1506 (FIG. 12)), then the display control unit 105 lowers the group classification level in processing 1507 (FIG. 12). At this time, a display screen "7. response" illustrated in FIG. 15 is displayed on the display screen A900.

In the example illustrated in FIG. 15, the number of times that the content image is displayed A1104, has been reset to "1" and the number of times that the display A906 is changed has been reset to "3". In addition, the display has been changed from the group classification information images to the content images. However, the order of displaying the content images is different from the order of displaying the content images on the display screen "1. initial state" illustrated in FIG. 13.

More specifically, the order of displaying the content images to be displayed as a result of the user instruction for lowering the group classification level is changed according to the grouping method selected in the processing 1504 illustrated in FIG. 12.

FIG. 16B illustrates an example of the order of displaying the content images to be displayed on the display screen "7. response" illustrated in FIG. 15 and the attribute information thereof.

Referring to FIGS. 16A and 16B, the order of displaying the content images illustrated in FIG. 16B is different from that illustrated in FIG. 16A.

More specifically, in the present exemplary embodiment, after the contents are grouped according to the grouping method "category of broadcast program", the display has changed from the group classification information images to the content images. Thus, the content images are sorted according to the attribute information 2, which indicates the category of broadcast program.

In the above-described manner, the present exemplary embodiment displays the content images sorted according to the selected grouping method. Accordingly, the user can effectively select a moving image content to view.

In the present exemplary embodiment, the contents are sorted according to the category of broadcast program. On the other hand, the present exemplary embodiment sorts the moving image contents having the attribute information for the same category of broadcast program in the ascending order of the attribute information 3 (the past broadcast date and time).

More specifically, as to the order of displaying the content images 411 and 414, which correspond to the moving image contents having the same attribute information 2, the present exemplary embodiment performs sorting so that the content image 411, which corresponds to the moving image content whose past broadcast date is older than the content image 414, is displayed prior to the content image 414. As to the order of displaying the content images 413 and 416, which correspond to the moving image contents having the same attribute information 2, the present exemplary embodiment performs sorting so that the content image 413, which corresponds to the moving image content whose past broadcast date is older, is displayed prior to the content image 416.

As described above, the present exemplary embodiment sorts the content image according to attribute information different from the attribute information included in the content images if the content images include the same attribute information. Accordingly, the present exemplary embodiment can allow the user to easily select a content to view.

However, the present exemplary embodiment is not limited to this. It is also useful if another attribute information such as a channel number, and the date and time of storage of the content image on the content storage unit 121 are used instead of using the attribute information 3.

As described above, in the present exemplary embodiment, the display control apparatus 100 displays the grouping method candidate list for grouping a plurality of contents when the number of times that the content image is displayed reaches a predetermined number of times.

Then, the display control apparatus 100 classifies and groups the contents by using the group classification information corresponding to a plurality of contents according to the grouping method selected by the user. The display control apparatus 100 displays the group classification information image thereof on the display unit 122.

Further, when the number of times that the group classification information image is displayed reaches the predetermined number, the display control apparatus 100 groups the contents by using the group classification information included in a higher group classification level. The display control apparatus 100 displays the group classification information image thereof on the display unit 122.

As described above, in the present exemplary embodiment, the display control apparatus 100 changes the number of times of display according to the number of times that the content image is displayed.

Furthermore, if the group classification information images are currently displayed and if the user gives an instruction for lowering the group classification level in this state, the display control apparatus 100 lowers the group classification level. If the current group classification level is a classification level one stage higher than the lowest group classification level (namely, the group classification level 1), then the display control apparatus 100 executes the processing for lowering the group classification level and changes the display from the display of the group classification information images to the display of the content images.

In addition, as to the order of displaying the group classification information images or the content images displayed when the group classification level is lowered, the display control apparatus 100 performs sorting according to the attribute information used in the grouping processing.

With the above-described configuration, the present exemplary embodiment can enable the user to effectively select a content to view from among a plurality of contents by changing the group classification level interlocking with the number of times that the content image is displayed.

In addition, in the present exemplary embodiment, when the number of times that the content image is displayed reaches the predetermined number of times, the display control apparatus 100 displays the grouping method candidate list for selecting a grouping method. Accordingly, the present exemplary embodiment can allow the user to sort the content images in the order according to the desired grouping method.

As described above, the content images can be displayed in the format illustrated in FIGS. 13 through 15 or that illustrated in FIG. 9.

In the present exemplary embodiment, as described above with reference to FIG. 10A, the moving image contents are classified and grouped such that each moving image content always belongs to a group. However, the present exemplary embodiment is not limited to this.

It is also useful if the moving image contents are grouped by the grouping method by which at least one part of the moving image contents belongs to either one of the groups as described above with reference to FIG. 10B.

More specifically, as described above with reference to FIG. 9C, it is also useful if the following method is implemented. If the user designates a grouping method "teleplay" when the number of times that the content image is displayed has reached the predetermined number, then the display control unit 105 groups the content images corresponding to the moving image contents having the attribute information "teleplay" (i.e., content images A, D, and C). In this case, the display control unit 105 does not group the other moving image contents B, G, E, and F.

If the user gives an instruction for lowering the group classification level, then, as illustrated in FIG. 9C, the content images to be displayed are sorted so that the content images corresponding to the moving image contents having the "teleplay" attribute information are arranged adjacent to one another on the display screen. In this case, it is also useful if the display of content images not related to the selected grouping method are excluded from the display.

With the above-described configuration, the present exemplary embodiment can enable the user to exclude the contents not satisfying a specific condition from the display at an early stage of processing. In addition, the present exemplary embodiment groups the content images related to the grouping method selected by the user using the group classification information image.

According to the present exemplary embodiment having the above-described configuration, if the user determines a content to view by such an elimination method, the user can effectively select a content to view.

Now, a fourth exemplary embodiment of the present invention will be described in detail below. In the following description, a configuration of the present exemplary embodiment different from those of the above-described first through third exemplary embodiments will be primarily described.

In the above-described third exemplary embodiment, the display control apparatus 100 changes the group classification level for grouping the moving image contents according to the number of times that the content image is displayed. In the present exemplary embodiment, the group classification level for grouping the moving image contents is changed according to the length of scroll time on the content images (hereinafter also referred to as a "content image scroll time length").

In the present exemplary embodiment, to "raise" the group classification level includes changing of the display from the display of the content images (in the lowest group classification level) to the display of the group classification information images as in the third exemplary embodiment.

Referring to FIG. 1, in the present exemplary embodiment, when the user operates the operation unit 120 to start the scroll operation, the scroll information acquisition unit 102 starts counting scroll time of the content image. The scroll information acquisition unit 102 outputs the counted scroll time of the content image to the boundary determination unit 104. The processing corresponds to the processing in step S1402 illustrated in FIG. 11.

Then, the boundary determination unit 104 determines whether the scroll time of the content image counted by the scroll information acquisition unit 102 has reached a predetermined length of time. This corresponds to the processing in step S1403 illustrated in FIG. 11.

If it is determined that the scroll time of the content image has reached the predetermined time length and if it is determined that the current group classification level is not the highest group classification level (No in step S1404), then the processing advances to step S1405. In step S1405, the attribute acquisition unit 101 acquires the attribute information and the display control unit 105 displays the grouping method candidate list.

In step S1406, the user determines the grouping method. In step S1407, the image generation unit 103 generates a group classification information image according to the current group classification level. In step S1408, the display control unit 105 raises the group classification level.

If the content images have been displayed up to that time after the group classification level is raised, the display control unit 105 displays the group classification information images. On the other hand, if the group classification information images have been displayed up to that time after the group classification level is raised, the display control unit 105 displays the group classification information images while more roughly grouping the contents.

More specifically, the display control unit 105 determines whether to display the group classification information so that the group classification information (group classification information images) of a plurality of contents is displayed when the scroll time of the content image reaches a predetermined length of time.

The processing in steps S1409 through S1414 is similar to that in the third exemplary embodiment. In the present exemplary embodiment, if the time length for display of the group classification information images exceeds a predetermined length of time, then the display control unit 105 further raises the group classification level as in the third exemplary embodiment.

More specifically, if the scroll time of the content image reaches a first predetermined length of time, the display control unit 105 displays first group classification information (group classification information images in the group classification level 1). In the present exemplary embodiment, the "first group classification information" refers to group classification information assigned to the first number groups.

If the scroll time of the content image reaches a second predetermined length of time, the display control unit 105 displays second group classification information (group classification information images in the group classification level 2). In the present exemplary embodiment, the "second group classification information" refers to group classification information assigned to the second number groups. The "second number groups" refers to the groups which are smaller than the first number groups.

In the above-described third exemplary embodiment, as illustrated in FIG. 13, the number of times that display is changed A906 and the number of times that content image is displayed A1104 are displayed on the display screen. In the present exemplary embodiment, a length of time for change of display (hereinafter simply referred to as a "display change time length") and a length of time for display (hereinafter simply referred to as a "content image display time length") are displayed instead of the number of times that is changed display A906 and the number of times that content image A1104 is displayed.

The display change time length corresponds to the predetermined length of time taken when comparing the content image scroll time length in the processing in step S1402 (FIG. 11). Furthermore, the display time of the content image indicates the content image scroll time acquired by the scroll information acquisition unit 102.

In the present exemplary embodiment, the display change time length has a value determined according to the current group classification level. More specifically, the boundary determination unit 104 changes the display change time length so that the display change time length, when the current group classification level is high, becomes shorter than when the current group classification level is low for the following reasons.

When the group classification level is raised, the number of displayed images becomes smaller. Accordingly, when the images are scroll-displayed at a constant scroll speed for a specific length of time, the number of times of display becomes larger as the group classification level becomes higher.

When the number of times of display is large but the content to view has not yet been selected by the user, it is highly likely that the user has not decided a content to view yet. Therefore, in the present exemplary embodiment, the display control apparatus 100 sets the display change time length so that the display change time length (the predetermined length of time) in a high group classification level becomes shorter than that in a low group classification level.

With the above-described configuration, the present exemplary embodiment can enable the user to easily and quickly select a content to view if the user has not decided a content to view. It is also useful if a fixed value is set as the display change time length regardless of the current group classification level.

As described above, in the present exemplary embodiment, if the content image scroll time length reaches a predetermined time length, the display control apparatus 100 groups the moving image contents and scroll display of the group classification information images. This is because if the content image scroll time is long, it is likely that the user cannot select a content to view any more even if the scroll display of the same contents is continued.

If the user gives an instruction for lowering the group classification level, the display control apparatus 100 according to the present exemplary embodiment sorts the content images or the group classification information images to be displayed in the order according to the previously executed grouping.

As described above, in the present exemplary embodiment, the display control apparatus 100 counts the time taken for the scroll display. With the above-described simple configuration, the present exemplary embodiment can enable the user to change the group classification level for grouping the moving image contents and effectively select a content to view.

It is also useful in effectively controlling (changing) the group classification level if information about the scroll speed is used together with the information about the content image scroll time.

More specifically, even if the content image scroll time is the same in operations, if the scroll speed levels in the operations differ from each other, the numbers of times that the content image is displayed may differ.

Accordingly, if the scroll speed is high, the user may desire to change the group classification level before the content image scroll time reaches the predetermined length of time. In the present exemplary embodiment, if the scroll speed is high, the display control apparatus 100 lowers a threshold value of the content image scroll time for raising the group classification level than that when the scroll speed is low. With the above-described configuration, the present exemplary embodiment can effectively control the group classification level.

In the above-described third exemplary embodiment, if the number of times that the content image is displayed reaches a predetermined number, the display control unit 105 displays the group classification information images. However, it is also useful if the display control unit 105 sorts the content images to be displayed in the order determined according to the grouping method selected by the user when the number of times that the content image is displayed reaches a predetermined number of times.

More specifically, in the present exemplary embodiment, it is also useful if the display control unit 105 sorts the content images to be displayed instead of displaying the group classification information images if the number of times that the content image is displayed reaches a predetermined number as in the third exemplary embodiment.

In this case, the image generation unit 103 can classify and group a plurality of contents by using the group classification information of the plurality of contents. Furthermore, in this case, the image generation unit 103 does not generate a group classification information image.

If the number of times that the content image is displayed reaches a predetermined number, then the display control unit 105 displays a result of the grouping performed by the image generation unit 103. Also in this manner, the user can effectively select a content to view.

In addition, it is also useful if the display control unit 105 displays a representative images of moving image contents included in a specific group in group classification information images as described above in the third exemplary embodiment.

With the above-described configuration according to the present exemplary embodiment, while the group classification information images are currently displayed, the user can recognize the moving image contents grouped in each group. Accordingly, the user can effectively select a content to view.

In the fourth exemplary embodiment, when the content image scroll time reaches a predetermined length of time, the display control unit 105 displays the group classification information images. However, the present exemplary embodiment is not limited to this. More specifically, it is also useful if the content images to be displayed are sorted in the order according to the grouping method selected by the user when the content image scroll time reaches a predetermined length of time.

In this case, it is also useful if the content images to be displayed are sorted instead of displaying the group classification information images as described above in the present exemplary embodiment.

More specifically, in this case, the image generation unit 103 classifies and groups a plurality of contents by using the group classification information of the plurality of contents. In this case, the image generation unit 103 does not generate a group classification information image. Furthermore, in this case, if the content image scroll time reaches a predetermined length of time, then the display control unit 105 displays a result of the grouping performed by the image generation unit 103.

With this configuration also, the present exemplary embodiment can enable the user to effectively select a content to view. Furthermore, it is also useful if the display control unit 105 displays a representative image of the moving image contents included in a specific group, in the group classification information images displayed as described above in the present exemplary embodiment.

With the above-described configuration according to the present exemplary embodiment, while the group classification information images are currently displayed, the user can recognize the moving image contents included in each group. Accordingly, the user can effectively select a content to view.

In the above-described third exemplary embodiment, if the number of times that a content image is displayed or a group classification information image reaches a predetermined number of times, the display control unit 105 raises the group classification level. However, it is also useful if the group classification level is raised if the number of times that a content image or a group classification information image is displayed reaches a predetermined number of times within a predetermined length of time.

More specifically, it is also useful if a time limit is applied in counting the number of times that the content image or the group classification information image is displayed. In this case, if the number of times of display of contents (content images) to be scroll-displayed has reached a predetermined number within a predetermined length of time from the start of the scroll display, then the display control unit 105 determines whether to display the group classification information (group classification information images) so that the group classification information of a plurality of contents is displayed, for the following reasons.

If the user scrolls the contents at a low scroll speed even after the number of times that the content images or the group classification information images is displayed has exceeded a predetermined number, it is highly likely that the user does not desire to change the display of the content images or group classification information images currently displayed.

Accordingly, if a predetermined length of time has elapsed since the start of the scroll display, the display control unit 105 resets the current number of times of display.

With the above-described configuration according to the present exemplary embodiment, the user can effectively select a content to view.

In each of the above-described exemplary embodiments, the moving image content includes a moving image of one integrated broadcast program. However, the present exemplary embodiment is not limited to this. More specifically, it is also useful if each moving image content includes a plurality of divided pieces of image data of one broadcast program. FIG. 17 illustrates an example of a method executed in this case.

Referring to FIG. 17, the content "A" (FIG. 16A), which belongs to the "baseball" group, includes three contents A1, A2, and A3, which are generated by dividing the content "A" and respectively include a moving image content including one entire inning or a plurality of innings.

If one entire broadcast program is divided into a plurality of moving image contents as described above, it is also useful to group the plurality of divided moving image contents by using the attribute information used in the division (i.e., the attribute information 3 in this case) in the similar manner as those in each of the above-described exemplary embodiment of the present invention.

More specifically, if the user desires to watch the scene including moving image content included in the group "7th to 9th innings" of a higher-level group "baseball" but the user has not decided which game to watch and if the user gives an instruction for classifying and grouping the contents according to the attribute information 3, then the user can sort the contents so that the scenes including moving image contents included in the group "7th to 9th innings" of each baseball broadcast program are sorted in the order in which the scenes (moving image contents) are arranged adjacent to one another.

With the above-described configuration according to the present exemplary embodiment, if the user has previously decided which scene to watch, the user can effectively select a content to view.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2008-288946, filed Nov. 11, 2008, and Application No. 2008-288947, filed Nov. 11, 2008, which are, hereby incorporated by reference herein in their entirety.

What is claimed is:

1. A display control apparatus for displaying a plurality of content items, the display control apparatus comprising:
a memory;
a processor coupled to the memory which executes the following:
storing the plurality of content items and time information corresponding to each of the plurality of content items;
allocating the plurality of content items into a plurality of groups according to attribute information associated with the content items;
acquiring information about a scroll speed; and
displaying the plurality of content items lines in a first order according to the time information corresponding to the plurality of content items,
displaying a list of grouping method candidates for grouping the plurality of content items after the scroll speed is more than a first predetermined speed, each of the grouping method candidates having a different type of a set of groups,
determining a grouping method from the grouping method candidates in the displayed list in accordance with a user's selection,
changing a display, in accordance with the determined grouping method, from scroll-displaying the plurality of content items in the first order according to the time information to scroll-displaying a first set of images representing first groups into which the plurality of content items are allocated, the first groups being grouped in the determined grouping method, and
changing a display, if the scroll speed is less than a second predetermined value from scroll-displaying the first set of images representing the first groups into which the plurality of content items are allocated to scroll-displaying the plurality of content items in a second order which is different from the first order such that the plurality of content items allocated into the same group of the first groups according to the attribute information which is different from the time information are displayed sequentially and adjacent to each other.

2. A display control apparatus according to claim 1, wherein, when the scroll speed of the scroll display is more than a third predetermined speed or the amount of variation of the scroll speed in a unitary time period becomes more than a second predetermined value the display is changed from scroll-displaying the first set of images to scroll-displaying a second set of images representing second groups into which a plurality of content items are allocated, the second groups being fewer than the first groups.

3. A display control apparatus according to claim 2, wherein, when the scroll speed is less than the second predetermined value, the display is changed from scroll-displaying the second set of images to scroll-displaying the first set of images.

4. A display control apparatus according to claim 1, wherein groups of content items overlap in their content such that one content item may be allocated to more than one group.

5. A display control apparatus according to claim 1, wherein the images are scrolled in at least one of: vertically, horizontally, diagonally, and around a virtual 2-D or 3-D shape.

6. A display control apparatus according to claim 1, wherein the displayed images are still or moving images and the images are changed from being still images to being moving images when the images enter a predefined area of the display.

7. A display control apparatus according to claim 1, further comprising displaying grouping options, the grouping options enabling a user to choose which attribute information of the content items is to be used to allocate the content items into the first groups, and the grouping options being displayed in accordance with a change of state of the display.

8. A display control apparatus according to claim 1, wherein the content items are displayed in the first order regardless of the groups into which the content items are allocated.

9. A display control apparatus according to claim 1, wherein, the time information indicates a broadcast time of each of the plurality of content items.

10. A method of scroll-displaying a plurality of content items, the method comprising:
   storing the plurality of content items and time information corresponding to each of the plurality of content items;
   allocating the plurality of content items into a plurality of groups according to attribute information associated with the content items;
   acquiring information about a scroll speed;
   displaying the plurality of content items lined in a first order according to the time information corresponding to the plurality of content items,
   displaying a list of grouping method candidates for grouping the plurality of content items after the scroll speed is more than a first predetermined speed, each of the grouping method candidates having a different type of a set of groups,
   determining a grouping method from the grouping method candidates in the displayed list in accordance with a user's selection,
   changing a display, in accordance with the determined grouping method, from scroll-displaying the plurality of content items in the first order according to the time information to scroll-displaying a first set of images representing first groups into which the plurality of content items are allocated, the first groups being grouped in the determined grouping method; and
   changing the display, if the scroll speed is less than a second predetermined value from scroll-displaying the first set of images representing the groups into which the plurality of content items are allocated to scroll-displaying the plurality of content items in a second order which is different from the first order such that the plurality of content items allocated into the same group of the first groups according to the attribute information which is different from the time information are displayed sequentially and adjacent to each other.

11. A non-transitory computer readable medium containing computer-executable instructions for allocating the plurality of content items scroll-displayed in a first order into a plurality of groups according to attribute information associated with the content items:
   instructions for storing the plurality of content items and time information corresponding to each of the plurality of content items;
   instructions for acquiring information about a scroll speed;
   instructions for displaying the plurality of content items lined in a first order according to the time information corresponding to the plurality of content items,
   instructions for displaying a list of grouping method candidates for grouping the plurality of content items after the scroll speed is more than a first predetermined speed, each of the grouping method candidates having a different type of a set of groups,
   instructions for determining a grouping method from the grouping method candidates in the displayed list in accordance with a user's selection,
   instructions for changing a display, in accordance with the determined grouping method, from scroll-displaying the plurality of content items in the first order according to the time information to scroll-displaying a first set of images representing first groups into which the plurality of content items are allocated, the first groups being grouped in the determined grouping method; and
   instructions for changing the display, if the scroll speed is less than a second predetermined value from scroll-displaying the first set of images representing the first groups into which the plurality of content items are allocated to scroll-displaying the plurality of content items in a second order which is different from the first order such that the plurality of content items allocated into the same group of the first groups according to the attribute information which is different from the time information are displayed sequentially and adjacent to each other.

12. A display control apparatus for displaying a plurality of content items, the display control apparatus comprising: a memory; a processor coupled to the memory which executes the following:
   storing the plurality of content items and time information corresponding to each of the plurality of content items;
   allocating the plurality of content items into a plurality of groups according to attribute information associated with the content items;
   acquiring the time information, wherein the time information is a number of times a content item has been displayed;
   and displaying the plurality of content items lined in a first order according to the time information corresponding to the plurality of content items,
   displaying a list of grouping method candidates for grouping the plurality of content items after the scroll speed is more than a first predetermined speed, each of the grouping method candidates having a different type of a set of groups,
   determining a grouping method from the grouping method candidates in the displayed list in accordance with a user's selection,
   changing a display, in accordance with the predetermined grouping method, when the number of times a content item has been displayed reaches a predetermined number, from scroll-displaying the plurality of content items in the first order according to the time information to scroll-displaying a first set of images representing first groups into which the plurality of content items are allocated, and for changing a display, when the scroll speed becomes less than a second predetermined value, from scroll-displaying the first set of images representing the first groups into which the plurality of content items are allocated to scroll-displaying the plurality of content items in a second order which is different from the first order such that the plurality of content items allocated into the same group of the first groups according to the attribute information which is different from the acquired information are displayed sequentially and adjacent to each other.

13. A display control apparatus according to claim 12, wherein, when a number of times an image representing a group of content items has been displayed reaches a predetermined number, the display is changed from displaying the first set of images representing the first groups of the content items to displaying a second set of images representing second groups of the content items, the second groups being fewer than the first groups.

14. A display control apparatus according to claim 13, further comprising displaying the number of times an image has been displayed.

15. A display control apparatus for displaying a plurality of content items, the display control apparatus comprising: a memory; a processor coupled to the memory which executes the following:
    storing the plurality of content items and time information corresponding to each of the plurality of content items;
    allocating the plurality of content items into a plurality of groups according to attribute information associated with the content items;
    acquiring the time information, wherein the time information is a length of a scrolling time for which the plurality of content items has been scrolled continuously;
    and displaying the plurality of content items lined in a first order according to the time information corresponding to the plurality of content items,
    displaying a list of grouping method candidates for grouping the plurality of content items after the scroll speed is more than a first predetermined speed, each of the grouping method candidates having a different type of a set of groups,
    determining a grouping method from the grouping method candidates in the displayed list in accordance with a user's selection,
    changing a display, in accordance with the determined grouping method, when the length of the scrolling time for which the plurality of content items has been scrolled continuously reaches a predetermined length, from scroll-displaying the plurality of content items in the first order according to the time information to scroll-displaying a first set of images representing first groups into which the plurality of content items are allocated, the first groups being grouped in the determined grouping method, and changing a display, if the scroll speed becomes less than a second predetermined value from scroll-displaying the first set of images representing the first groups into which the plurality of content items are allocated to scroll-displaying the plurality of content items in a second order which is different from the first order such that the plurality of content items allocated into the same group of the first, groups according to the attribute information which is different from the acquired information are displayed sequentially and adjacent to each other.

16. A display control apparatus according to claim 15, wherein when a length of a scrolling time for which a plurality of sets of images representing a group of the content items has been scrolled continuously reaches a predetermined time length, the display is changed from scroll-displaying the first set of images representing the first groups of the content items to scroll-displaying a second set of images representing a second groups of the content items, the second groups being fewer than the first groups.

* * * * *